US011989016B2

(12) United States Patent
Dorval et al.

(10) Patent No.: US 11,989,016 B2
(45) Date of Patent: *May 21, 2024

(54) AUTOMATED STORAGE AND RETRIEVAL SYSTEM WITH INTEGRAL SECURED PERSONNEL ACCESS ZONES AND REMOTE ROVER SHUTDOWN

(71) Applicant: Symbotic LLC, Wilmington, MA (US)

(72) Inventors: Rick K. Dorval, Dunbarton, NH (US); Todd Comins, Chelmsford, MA (US)

(73) Assignee: Symbotic LLC, Wilmington, MA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/812,009

(22) Filed: Jul. 12, 2022

(65) Prior Publication Data
US 2022/0342413 A1 Oct. 27, 2022

Related U.S. Application Data

(63) Continuation of application No. 16/987,963, filed on Aug. 7, 2020, now Pat. No. 11,385,634, which is a
(Continued)

(51) Int. Cl.
*G05D 1/00* (2006.01)
(52) U.S. Cl.
CPC ............. *G05D 1/00* (2013.01); *G05D 1/0297* (2013.01); *G05D 2201/0216* (2013.01)
(58) Field of Classification Search
CPC ................................ G05D 1/00; G05D 1/0297
See application file for complete search history.

(56) References Cited

U.S. PATENT DOCUMENTS

| 771,152 A | 9/1904 | Hoyle |
| 1,887,667 A | 11/1932 | Wheeler |

(Continued)

FOREIGN PATENT DOCUMENTS

| DE | 2011117487 | 12/2012 |
| EP | 1193195 | 4/2002 |

(Continued)

OTHER PUBLICATIONS

International Search Report, Application No. PCT/US2014/030204, dated Jun. 27, 2014.

*Primary Examiner* — Kyle O Logan
(74) *Attorney, Agent, or Firm* — Perman & Green, LLP

(57) ABSTRACT

A transportation system having a transportation space including destinations distributed in the transportation space, multiple independent automated vehicles configured for free roving through the transportation space to and between the destinations so that the vehicles are dynamically distributed through the transportation space, a control system communicably connected via a remote communication link to each of the vehicles and having a system controller that addresses each vehicle to different destinations, and the control system having a vehicle accountant controller separate and distinct from the system controller and configured to independently register a dynamic location of at least one of the vehicles, selected from the multiple vehicles in the transportation space, and command shutdown, via the remote communication link, to only the selected at least one vehicle at the registered location if the registered location corresponds to a predetermined location.

23 Claims, 20 Drawing Sheets

Related U.S. Application Data continuation of application No. 16/519,958, filed on Jul. 23, 2019, now Pat. No. 10,739,766, which is a continuation of application No. 16/150,085, filed on Oct. 2, 2018, now Pat. No. 10,359,777, which is a continuation of application No. 14/215,355, filed on Mar. 17, 2014, now Pat. No. 10,088,840.

(60) Provisional application No. 61/794,065, filed on Mar. 15, 2013.

(56) References Cited

U.S. PATENT DOCUMENTS

| | | | |
|---|---|---|---|
| 3,661,280 A | 5/1972 | Atwater | |
| 3,738,506 A | 6/1973 | Cornford et al. | |
| 3,845,715 A | 11/1974 | Hochstrasser | |
| 4,394,104 A | 7/1983 | Camerini et al. | |
| 4,415,975 A | 11/1983 | Burt | |
| 4,492,504 A | 1/1985 | Hainsworth | |
| 4,678,390 A | 7/1987 | Bonneton et al. | |
| 4,883,401 A | 11/1989 | Kavieff | |
| 4,967,370 A | 10/1990 | Stern et al. | |
| 5,337,880 A | 8/1994 | Claycomb et al. | |
| 5,370,492 A | 12/1994 | Gleyze et al. | |
| 5,559,696 A | 9/1996 | Borenstein | |
| 5,615,992 A | 4/1997 | Proske et al. | |
| 5,798,920 A | 8/1998 | Crucius et al. | |
| 5,801,506 A | 9/1998 | Netzler | |
| 5,974,348 A | 10/1999 | Rocks | |
| 6,124,805 A | 9/2000 | Gabbard | |
| 6,213,704 B1 | 4/2001 | White et al. | |
| 6,295,922 B1 | 10/2001 | Salamone et al. | |
| 6,463,360 B1 | 10/2002 | Terada et al. | |
| 6,597,143 B2 | 7/2003 | Song et al. | |
| 6,663,334 B2 | 12/2003 | Warhurst et al. | |
| 6,922,632 B2 | 6/2005 | Foxlin | |
| 7,039,501 B2 | 5/2006 | Freeman et al. | |
| 7,065,391 B2 | 6/2006 | Kanayama et al. | |
| 7,069,124 B1 | 6/2006 | Whittaker et al. | |
| 7,101,139 B1 | 9/2006 | Benedict | |
| 7,283,810 B1 | 10/2007 | Arakawa et al. | |
| 7,284,652 B2 | 10/2007 | Zeitler et al. | |
| 7,421,268 B2 | 9/2008 | Lee et al. | |
| 7,456,596 B2 | 11/2008 | Goodall et al. | |
| 7,499,155 B2 | 3/2009 | Cappelletti et al. | |
| 7,568,572 B2 | 8/2009 | Zeitler et al. | |
| 7,575,406 B2 | 8/2009 | Hofmeister et al. | |
| 7,684,877 B2 * | 3/2010 | Weatherhead | G05B 23/0213 718/1 |
| 7,686,560 B2 | 3/2010 | Laurin et al. | |
| 76,848,772 | 3/2010 | Weatherhead et al. | |
| 7,695,235 B1 | 4/2010 | Rallis | |
| 7,706,917 B1 | 4/2010 | Chiappetta et al. | |
| 7,725,253 B2 | 5/2010 | Foxlin | |
| 7,729,801 B2 | 6/2010 | Abramson | |
| 7,771,152 B2 | 8/2010 | Waltersbacher | |
| 7,783,383 B2 | 8/2010 | Eliuk et al. | |
| 7,813,820 B2 * | 10/2010 | Opem | G05B 19/0428 700/79 |
| 7,826,919 B2 | 11/2010 | D'Andrea et al. | |
| 7,873,469 B2 | 1/2011 | Dandrea et al. | |
| 7,894,917 B2 | 2/2011 | Weatherhead et al. | |
| 7,931,431 B2 | 4/2011 | Benedict et al. | |
| 7,944,368 B2 | 4/2011 | Carter et al. | |
| 7,959,395 B2 | 6/2011 | Hofmeister et al. | |
| 7,963,384 B2 | 6/2011 | Lafontaine | |
| 7,972,102 B2 | 7/2011 | Ward et al. | |
| 7,974,736 B2 * | 7/2011 | Morin | F41A 23/34 901/6 |
| 7,988,398 B2 | 8/2011 | Hofmeister et al. | |
| 8,006,824 B2 | 8/2011 | Wada et al. | |
| 8,046,103 B2 | 10/2011 | Abramson | |
| 8,046,160 B2 | 10/2011 | Carter et al. | |
| 8,090,993 B2 | 1/2012 | Yoshida et al. | |
| 8,193,917 B2 * | 6/2012 | Schmickley | G05B 19/042 340/521 |
| 8,892,241 B2 * | 11/2014 | Weiss | B65G 1/1378 700/229 |
| 9,120,622 B1 | 9/2015 | Elazary et al. | |
| 9,205,979 B2 | 12/2015 | Steinbach | |
| 11,385,634 B2 * | 7/2022 | Dorval | G05D 1/0297 |
| 2002/0037208 A1 | 3/2002 | Patrito | |
| 2002/0143461 A1 * | 10/2002 | Burns | G08G 1/207 701/23 |
| 2002/0159879 A1 * | 10/2002 | Elger | H01L 21/67276 700/225 |
| 2003/0069665 A1 | 4/2003 | Haag | |
| 2004/0017929 A1 | 1/2004 | Bramblet et al. | |
| 2004/0018817 A1 | 1/2004 | Kanayama et al. | |
| 2006/0043111 A1 | 3/2006 | Jennings et al. | |
| 2007/0061041 A1 | 3/2007 | Zweig | |
| 2007/0065258 A1 | 3/2007 | Benedict et al. | |
| 2007/0065259 A1 | 3/2007 | Talley | |
| 2007/0071585 A1 | 3/2007 | Henkel | |
| 2007/0276535 A1 | 11/2007 | Haag | |
| 2008/0044262 A1 | 2/2008 | Kim et al. | |
| 2008/0075357 A1 | 3/2008 | Yoon et al. | |
| 2008/0080963 A1 | 4/2008 | Bufano et al. | |
| 2008/0251717 A1 | 11/2008 | Kortelainen | |
| 2009/0033316 A1 | 2/2009 | Hosek et al. | |
| 2009/0074545 A1 | 3/2009 | Lert, Jr. et al. | |
| 2009/0085741 A1 | 4/2009 | Ravi et al. | |
| 2009/0148259 A1 | 6/2009 | Shani | |
| 2009/0224750 A1 | 9/2009 | Hosek et al. | |
| 2010/0118149 A1 | 5/2010 | Levin et al. | |
| 2010/0121481 A1 | 5/2010 | Talley et al. | |
| 2010/0183409 A1 | 7/2010 | Checketts et al. | |
| 2010/0185353 A1 | 7/2010 | Barwick et al. | |
| 2010/0188210 A1 | 7/2010 | Howard et al. | |
| 2010/0211195 A1 | 8/2010 | Gebuhr et al. | |
| 2010/0241753 A1 | 9/2010 | Garbajs et al. | |
| 2010/0295943 A1 | 11/2010 | Cha et al. | |
| 2010/0305854 A1 | 12/2010 | Kammel et al. | |
| 2010/0316468 A1 * | 12/2010 | Lert | B65G 1/1378 414/273 |
| 2011/0038692 A1 | 2/2011 | Hofmeister et al. | |
| 2011/0043373 A1 | 2/2011 | Best et al. | |
| 2011/0068943 A1 | 3/2011 | Lane, Jr. | |
| 2011/0125323 A1 | 5/2011 | Gutmann et al. | |
| 2011/0182703 A1 | 7/2011 | Alan | |
| 2011/0202175 A1 | 8/2011 | Romanov et al. | |
| 2011/0208350 A1 | 8/2011 | Eliuk et al. | |
| 2011/0298579 A1 * | 12/2011 | Hardegger | F16P 3/14 340/3.1 |
| 2012/0035750 A1 * | 2/2012 | Edel | G05B 9/02 700/79 |
| 2012/0083906 A1 | 4/2012 | Weatherhead et al. | |
| 2012/0095575 A1 | 4/2012 | Meinherz et al. | |
| 2012/0185080 A1 * | 7/2012 | Cyrulik | B65G 1/1373 700/214 |
| 2013/0158708 A1 * | 6/2013 | Emmertz | G05B 19/0428 700/248 |
| 2014/0088758 A1 * | 3/2014 | Lert | B65G 1/065 700/214 |
| 2014/0301810 A1 * | 10/2014 | Steinbach | B65G 1/0492 414/273 |
| 2014/0343717 A1 * | 11/2014 | Dorval | G05D 1/00 700/217 |
| 2020/0371514 A1 * | 11/2020 | Dorval | G05D 1/0297 |
| 2022/0342413 A1 * | 10/2022 | Dorval | G05D 1/0297 |

FOREIGN PATENT DOCUMENTS

| | | |
|---|---|---|
| EP | 2436620 | 4/2012 |
| JP | 53089180 | 8/1978 |
| JP | 60183405 | 9/1985 |
| JP | 61094905 | 5/1986 |
| JP | 61271505 | 12/1986 |
| JP | 62140902 | 6/1987 |
| JP | 2002167006 | 6/2002 |
| JP | 2004056381 | 2/2004 |
| JP | 2007135347 | 5/2007 |

(56) References Cited

FOREIGN PATENT DOCUMENTS

| | | |
|---|---|---|
| JP | 2009271592 | 11/2009 |
| WO | 0055827 | 3/1999 |
| WO | 2005071597 | 1/2005 |
| WO | 2010118412 | 10/2010 |
| WO | 2012083055 | 6/2012 |
| WO | 2013060569 | 5/2013 |

* cited by examiner

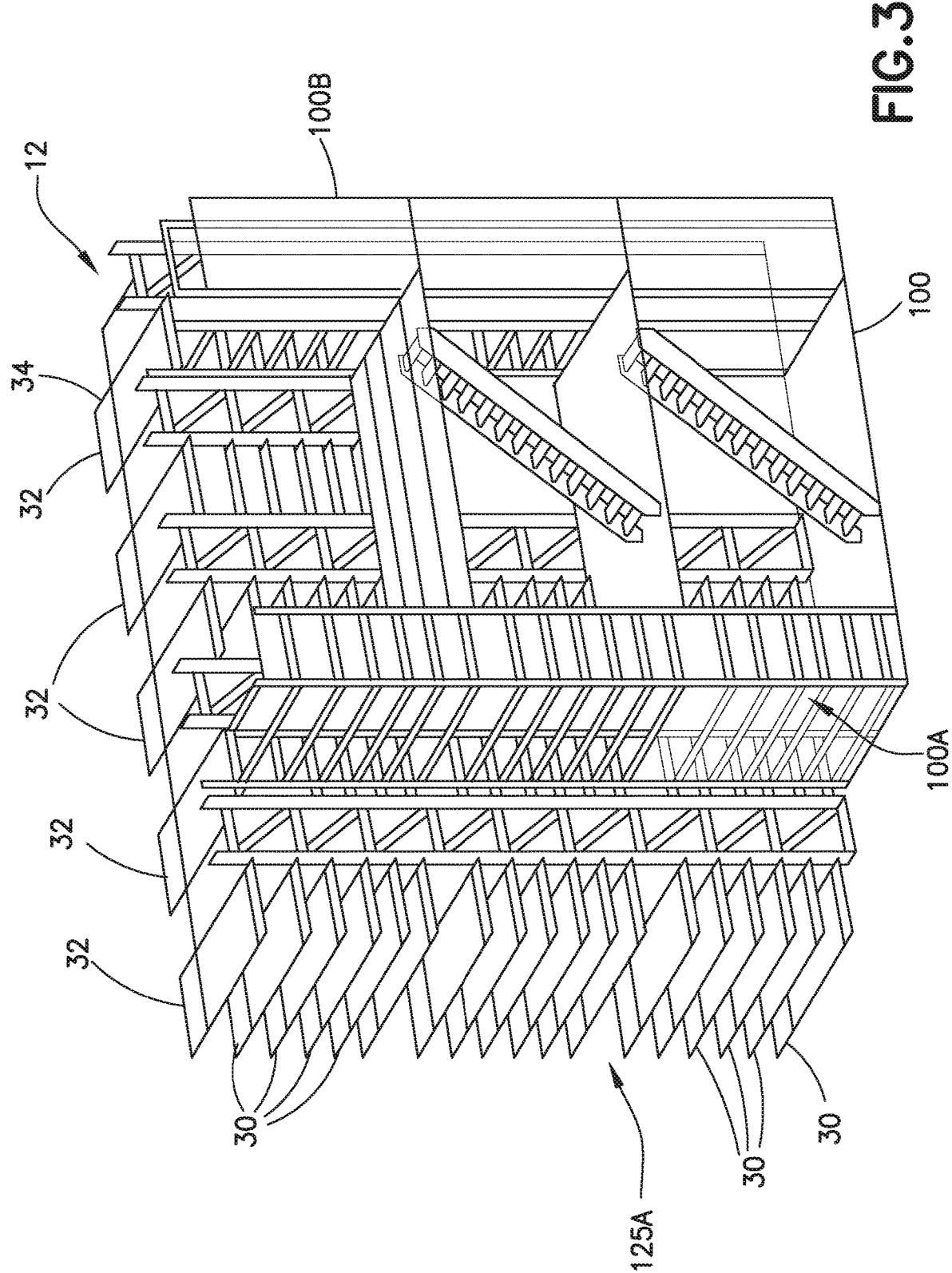

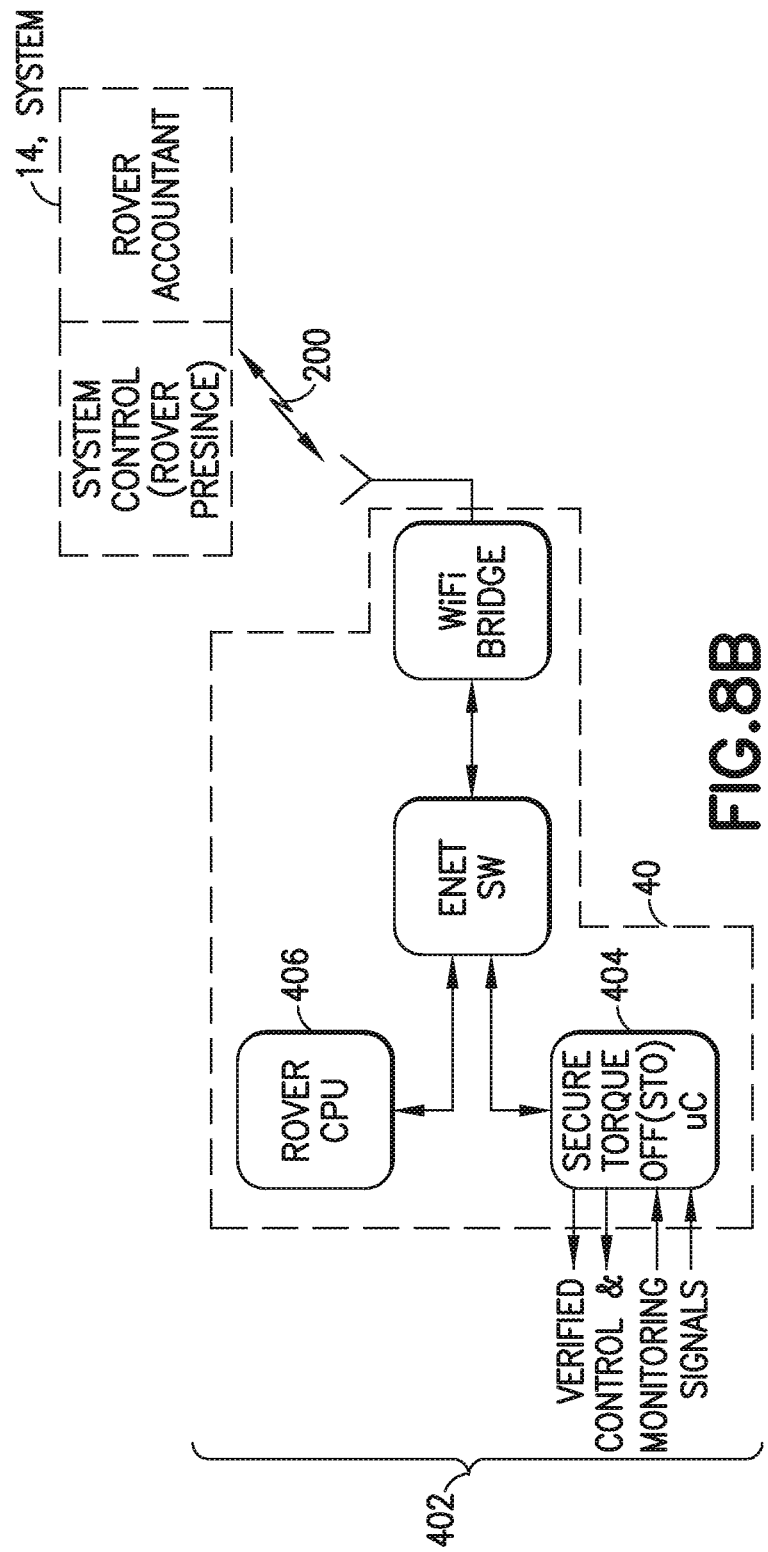

AUTOMATED STORAGE AND RETRIEVAL SYSTEM WITH INTEGRAL SECURED PERSONNEL ACCESS ZONES AND REMOTE ROVER SHUTDOWN

CROSS REFERENCE TO RELATED APPLICATIONS

This application is a continuation of U.S. application Ser. No. 16/987,963, filed on Aug. 7, 2020 (now U.S. Pat. No. 11,385,634) which is a continuation of U.S. application Ser. No. 16/519,958, filed on Jul. 23, 2019, (now U.S. Pat. No. 10,739,766) which is a continuation of U.S. application Ser. No. 16/150,085, filed on Oct. 2, 2018, (now U.S. Pat. No. 10,359,777) which is a continuation of U.S. application Ser. No. 14/215,355, filed on Mar. 17, 2014, (now U.S. Pat. No. 10,088,840) which is a non-provisional of and claims the benefit of U.S. provisional patent application No. 61/794,065, filed on Mar. 15, 2013 the disclosures of which are incorporated by reference herein in their entireties.

BACKGROUND

1. Field

The one or more aspects of the exemplary embodiment generally relate to automated storage and retrieval systems for warehouses and stores.

2. Brief Description of Related Developments

Automated storage and retrieval systems are desired such as for warehouses and stores because of the potential and imagined efficiencies that such systems present. Examples of such systems include storage structure that define one or more levels of storage locations and automated transport systems (such as carts, fork lifts, other independent automated vehicles or rovers, elevators, linearly continuous transport devices such as conveyors, roller beds, etc.) distributed or disposed to transport store units to and from store locations throughout the storage array. Realization of the efficiency potential presented by such systems may at times involve disparate factors that may act to mitigate the potential benefits of other factors. For example, dynamic allocation of storage locations in the array, with appropriate dynamic distribution of autonomous independent vehicles or rovers capable of effecting store unit placement in accordance with such allocation may provide for increased efficiencies in storage throughput. Similarly, greater transport speeds and freedom of movement of rovers may provide increased efficiency, and greater density of storage locations from having more storage levels or more closely spaced levels, or rack aisles may provide improved storage efficiency of the storage space. On the other hand, it may be desired to provide personnel access into the storage and/or transport space of the ASRS for human interaction whether planned in advance or reactive to an occurrence of condition and it is also desired that such personnel access be controlled and secured. Such access may serve to influence operational efficiency. As may be realized, high rover speeds, dynamic distribution (e.g. rover may be anywhere in space and time), closed packed density as mentioned above are factors that may impact somewhat granting personnel access into the storage array, and conversely providing dedicated personnel platforms within the storage may impact potential efficiencies of such features. Integration of personnel access zone without disruption of system efficiencies is desired.

BRIEF DESCRIPTION OF THE DRAWINGS

The foregoing aspects and other features of the disclosed embodiments are explained in the following description, taken in connection with the accompanying drawings, wherein:

FIG. 3 is a perspective view of a portion of the ASRS system shown in FIG. 1.

FIGS. 8A-8C are respectively schematic illustrations of different portions of an independent automated vehicle (rover) of the ASRS incorporating features in accordance with the exemplary embodiment;

DETAILED DESCRIPTION

Figure 1:
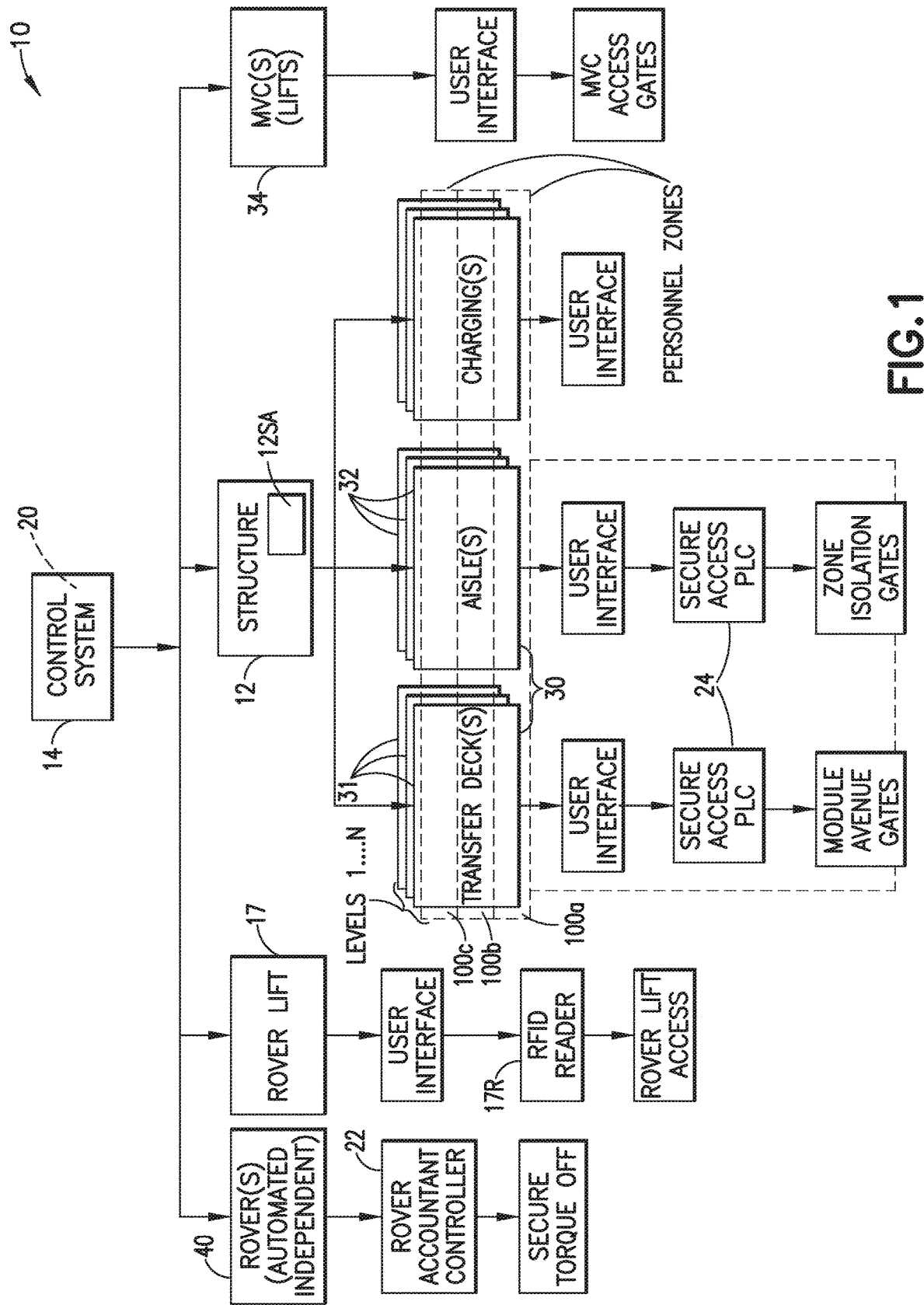
FIG. 1 is a block diagram schematically illustrating an automated storage and retrieval system (ASRS) incorporating features in accordance with the exemplary embodiment.

The automated storage and retrieval system (ASRS) 10 illustrated in FIG. 1 is a representative example of a storage system incorporating features in accordance with the exemplary embodiment and in alternate embodiments the storage system may have any suitable configuration. The organization of the elements shown in FIG. 1 is intended to illustrate interface and connectivity or interaction between elements and such elements may be organized in any suitable representation. For description purposes and for convenience, similar elements, whether in structure, composition, location or function may also be grouped together. Thus, by way of example, static controllers, microprocessors, PLC may be considered to be part of the ASRS control system.

Generally ASRS system 10 may operate in a retail distribution center or warehouse to, for example, fulfill orders received from retail stores for case units (where case units as used herein may include items not stored in trays, on totes or on pallets, and uncontained items stored in trays, totes or on pallets as well). It is noted that the case units may include cases of items (e.g. cases of soup cans, boxes of cereal, etc.) or individual items that are adapted to be taken off of or placed on a pallet or otherwise shipped independently. Thus, case units may be referred to herein to describe cases, or other shipping containers, and/or totes or other storage containers. Case units may also be referred to herein as store units or payload units. In accordance with the exemplary embodiment, shipping cases or case units (e.g. cartons, barrels, boxes crates, jugs, totes, pallets or any other suitable device for holding case units) may have variable sizes and may be used to hold items in shipping and may be configured so they are capable of being palletized for shipping or shipped independently in bulk shipping containers. It is noted that when, for example, bundles or pallets of case units arrive at the storage and retrieval system, the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which case units are stored and retrieved. In other aspects the case units may not be palletized when shipped to and from the warehouse facility, and may be individually packed in bulk shipping containers such as truck beds, etc.

Figure 3A:
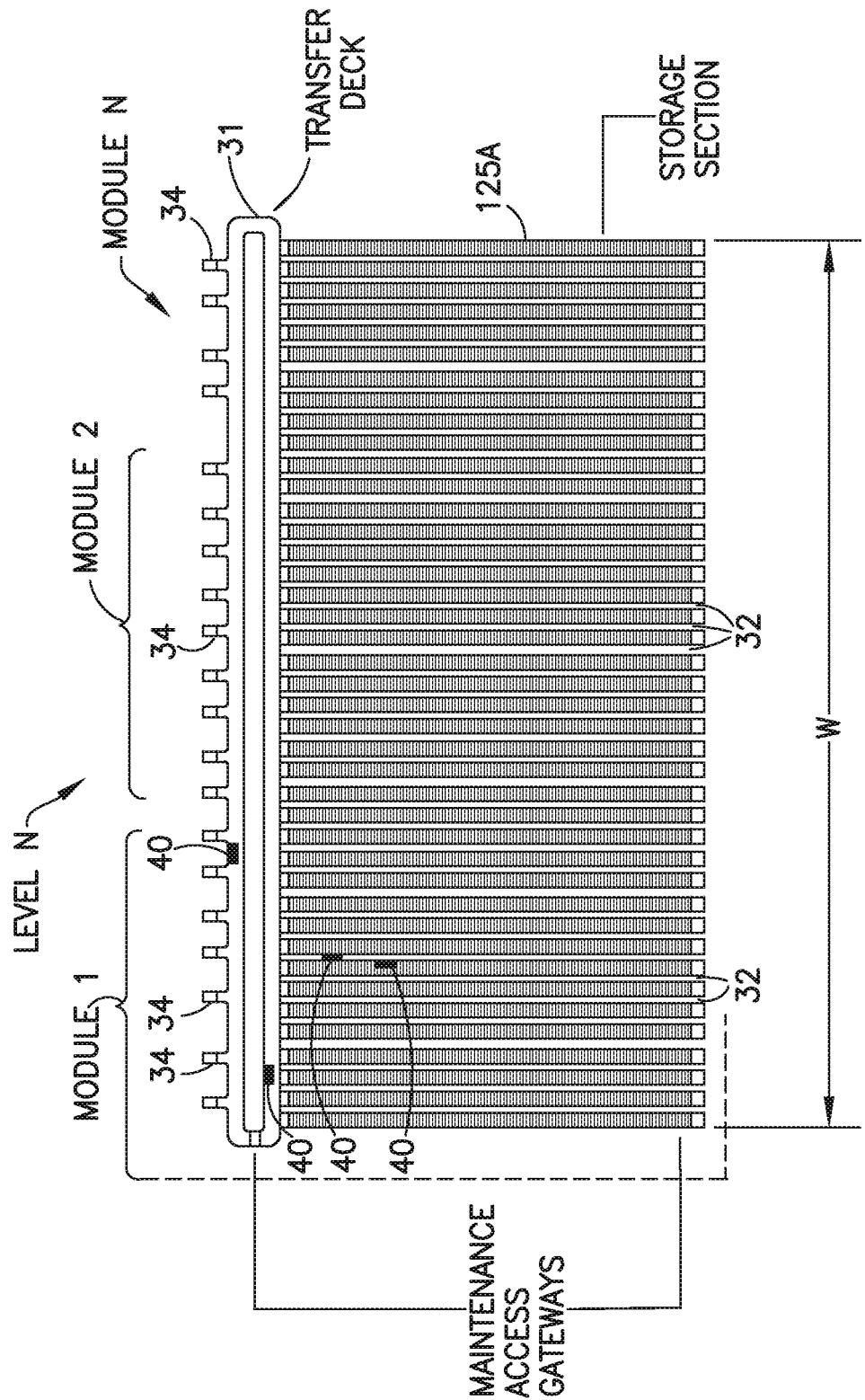
FIGS. 3A-3B are respectively a plan view, showing the plan form of a level of the ASRS structure defining the storage array and decks and aisles of the corresponding transport space, and a partial plan view showing another portion of the structure level.

As will be described in greater detail below, controlled, shielded and secure human access zones 100A-100n (generally referred to as access zones 100) are integrated into the ASRS 10 architecture, its structure 12, controls and components to satisfy IEC 61508, SIL-3 category criteria (incorporated by reference herein). The ASRS architecture generally includes a storage space with storage racks arrayed generally in levels and aisles being disposed for dynamic allocation of storage space to payload units see also FIG. 3. The ASRS architecture also includes a transport space, (e.g. open decks and rack aisles at different levels) arranged in association with the storage space, and having a population of free ranging rovers 40, configured to carry the case or payload units via the transport space to and from store locations in the storage array. The population of rovers is dynamically distributed through the transport space pursuant to tasking by the control system for dynamically picking or placing payload units to/from the storage locations. For description purposes, the rover population may be variably distributed in both location and kinematics at any given time, throughout the applicable transport space, and may be considered generally as defining a dynamic rover space. Human access to rover space may be desired for various conditions or actions, and such access is provided by integrating access zones 100 into the ASRS architecture and systems to provide control, shielding and security to satisfy, the aforementioned SIL-3 category criteria as will be described further herein.

As noted above, and referring still to FIG. 1, in the exemplary embodiment ASRS 10 includes structure 12 (see FIG. 3) that defines a storage array 12SA of storage locations. As seen best in FIG. 3, the storage array 12SA, and its associated structure 12 may provide a 3-D array having one or more levels for storage, and at each level the storage being arrayed along rows (in alternate embodiments the storage locations may be arrayed in a single planar or 2-D array).

The support structure, shelf or racks (not shown) of the storage locations may be configured to provide a substantially open or undeterministic support surface for seating the payload or store unit, so that the storage locations may be dynamically allocated. By way of example, this allows store (e.g. case) units of different sizes with respect to seating area to be accepted at a given storage location at different times. Accordingly, it is possible that each or any case unit may be stored at substantially each or any storage location along the storage rows. As may be realized from FIGS. 1 and 3, the ASRS may include independent automated vehicles (otherwise referred to as rovers or bots) 40-40n (FIG. 2) (generally referred to as rover(s) 40) each capable of carrying a store unit, as payload and independent automated traverse or movement via the transport space 30 (defined by the structure) to transport store units to and from allocated storage locations. The rovers 40 may be similar to vehicles or bots shown and described in U.S. patent application Ser. No. 12/757,312, filed Apr. 9, 2010, incorporated by reference herein in its entirety. In alternate aspects of the exemplary embodiment, the rovers may have any suitable configuration. As noted before, each rover 40 may be configured for independent motion, subject to tasking or commands from the rover system controller 20 of the ASRS control system 14 (see also FIG. 2). The rover system controller 20 may be suitably programmed with planning and control (PNC) software to plan and generate commands for each rover 40 to move in the transport space to desired destinations. In effecting tasks commands, the rover(s) 40 may be capable of independent route planning in the transport space, which may be performed by a rover controller 406 (FIG. 2) on board the rover (as will be described further below) or the routing may be generated and communicated to the rover controller 406. The rover(s) may also be capable of independent navigation along the prescribed routes to the command destinations and have resident sensors for pose and kinematic determination, such as by the onboard rover controller. Rover pose and location may also be communicated to the control system 14 as will be further described.

Referring again to FIGS. 1 and 3 as noted before the storage structure of the ASRS 10, has storage locations at a number of levels (1-n). In the exemplary embodiment, each level may have a transfer deck 31, that may define a substantially open and unrestricted drive surface for the rovers 40, and travel aisles 32 (see also FIG. 3A which is a plan view of storage levels 1-n of ASRS). As seen best in FIG. 3A, the travel aisles 32 are disposed alongside the storage shelves or racks, providing access to the rovers to each storage location disposed on a given aisle. Thus, as may be realized, rovers 40 may traverse the open deck to access a desired aisle, and then enter and traverse along the given aisle to the desired location. The rovers 40 may be considered, for purposes of description, to be free ranging or roving, in that each rover may be capable of moving along pathways (e.g. on the open deck) that may be substantially unrestricted (at least in part), and may move from any or each location in the transport space along various paths in order to effect dynamic storage placement and retrieval. Thus the rovers 40 may also be considered to be dynamically distributed in the ASRS, a distribution that changes with any given time. Continuous pose and kinematic monitoring of each rover by the control system 14 in such a dynamic population (each level may have multiple rovers) and environment would present a significant burden to the remote communication system 200 (see FIGS. 2, 2A) linking the control system 14 and each rover 40, a burden that is avoided here as described further below. Indeed, as may be realized, as rover(s) 40 are each capable of independent navigation rover position is desired, for planning and control, upon the rover reaching destinations, or when ready to depart from such (as well as a number of other limited situations, such as when the rover is loaded onto a level and initialized). Still referring to FIGS. 1 and 3, the ASRS 10 may further include lifts 34 for lifting/lowering case/store units from ASRS loading/unloading stations (not shown). The case lifts (e.g. a continuous multilevel vertical conveyor (MVC)) may provide a vertical transport for case units to each level, and may interface with the rovers at each level for transfer of store units in the horizontal plane to storage locations at any given level. Generally the ASRS may be similar to the storage and retrieval system shown and described in U.S. patent application Ser. No. 12/757,220, filed Apr. 9, 2010, which is incorporated by reference herein in its entirety. As noted above, ASRS 10 may further include a rover lift(s) 17, configured to independently (with respect to case lifts 34) raise and lower and correspondingly load and unload rovers (40) from each level. A rover presence sensor 17R (e.g. RFID or other information reader) may be provided proximate the rover lift access or entry to each level to register presence (on loading) or departure (on unloading) of rovers introduced or removed from the level transport space. The rover presence sensor 17R may communicate or signal the event occurrence and rover identity to the control system 14 via a suitable communication link. In the exemplary embodiment, the ASRS 10 may be modular in arrangement (see FIGS. 2, 3B and 4), where each module is capable of independent erection and full operation to desired throughput (thus enabling ASRS installation into existing facilities). The ASRS may have any desired number of modules, (which may be referred to herein as a matrix select module) and each module(s) being similar and including rovers, case lifts, rover lifts, system controllers (thus, figures and description may be representative for the whole system, a combination of modules or a single module).

Figure 3B:
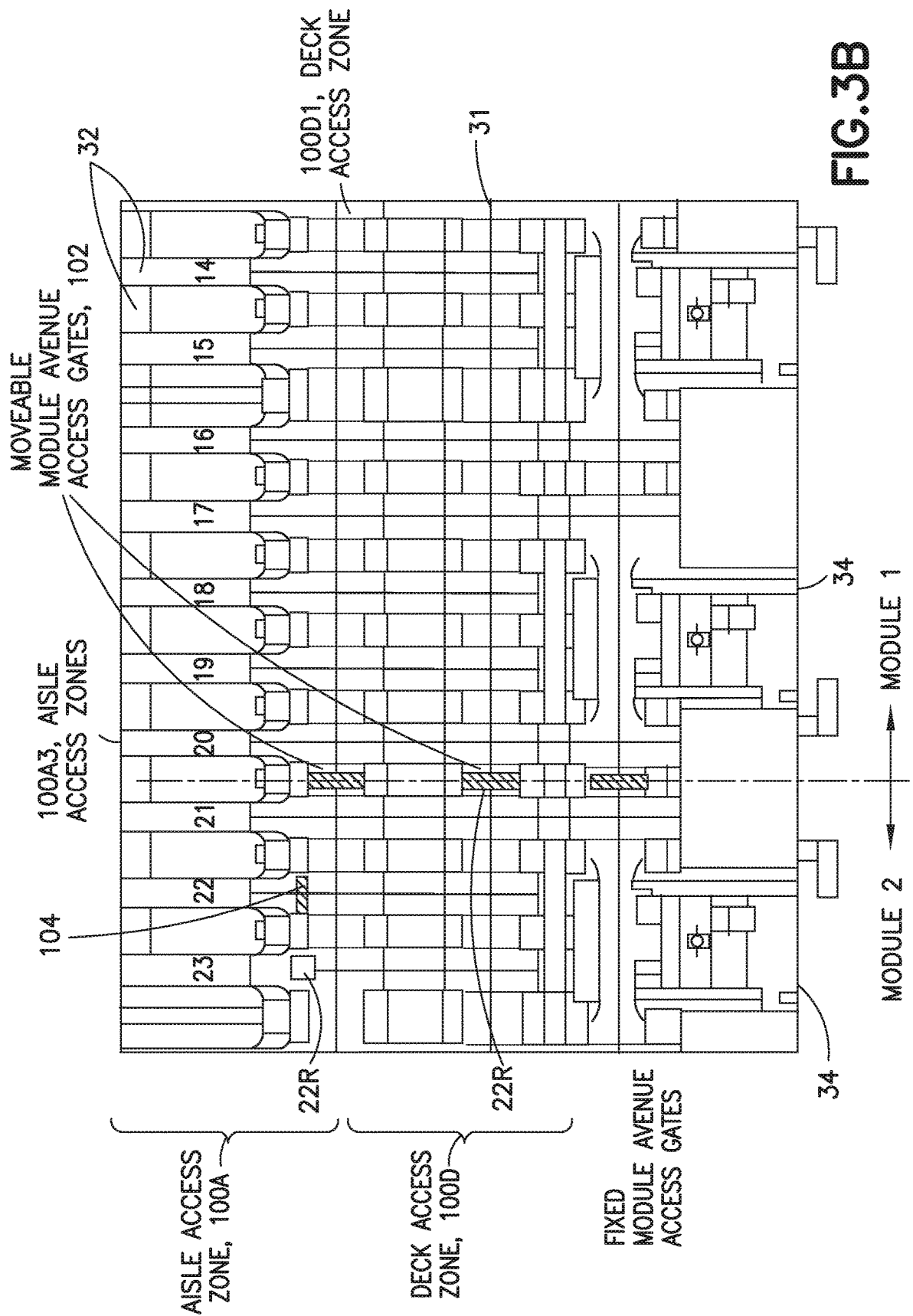
Figure 4:
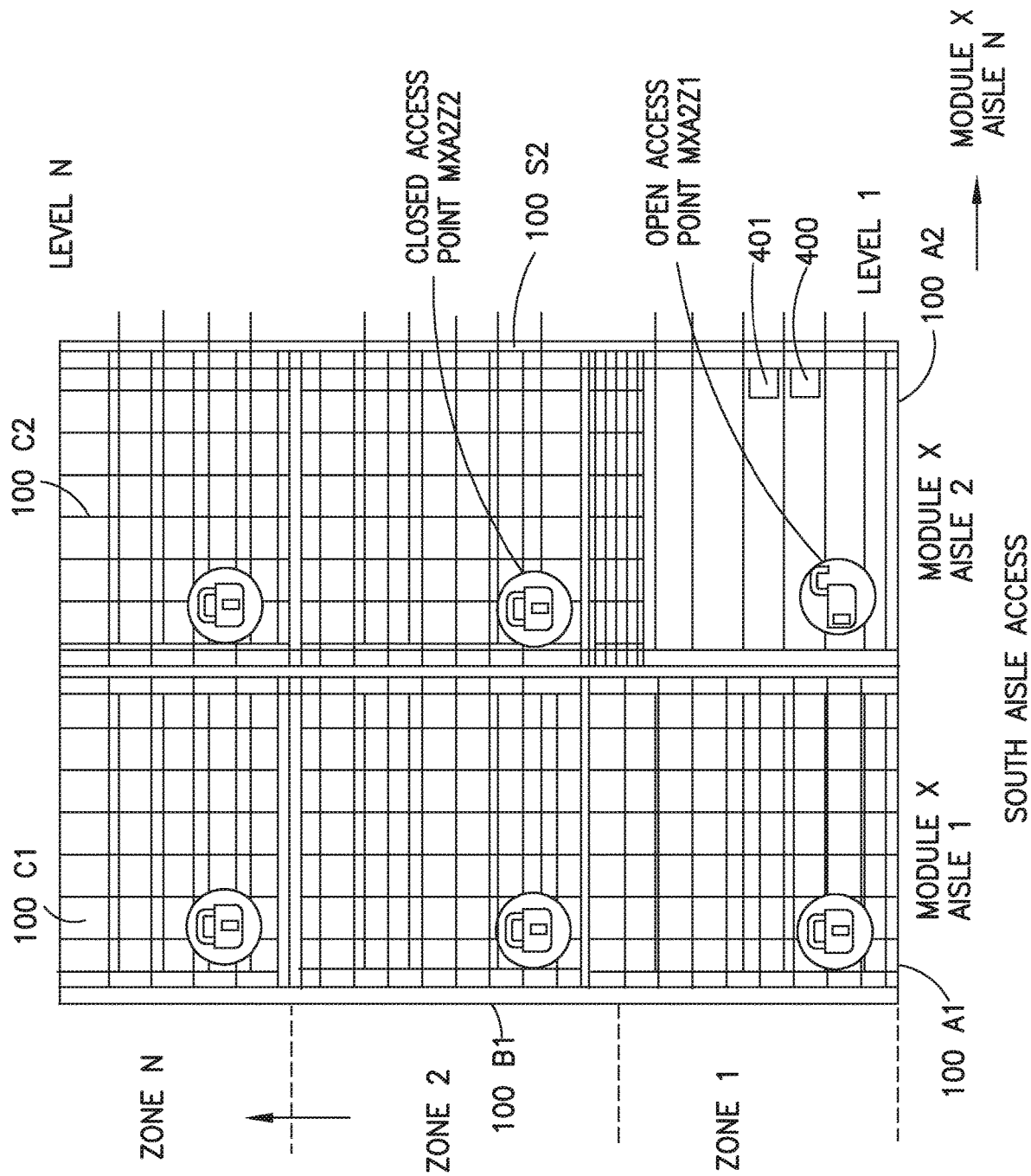
FIGS. 4 and 4A are respectively a partial elevation view of a side of the structure and showing the personnel access zones to the structure, and a partial perspective view of part of the transport space (e.g. part deck and aisle) at a storage level and the closable rover (independent automated vehicles) openings of a corresponding personnel access zone.
Figure 4A:
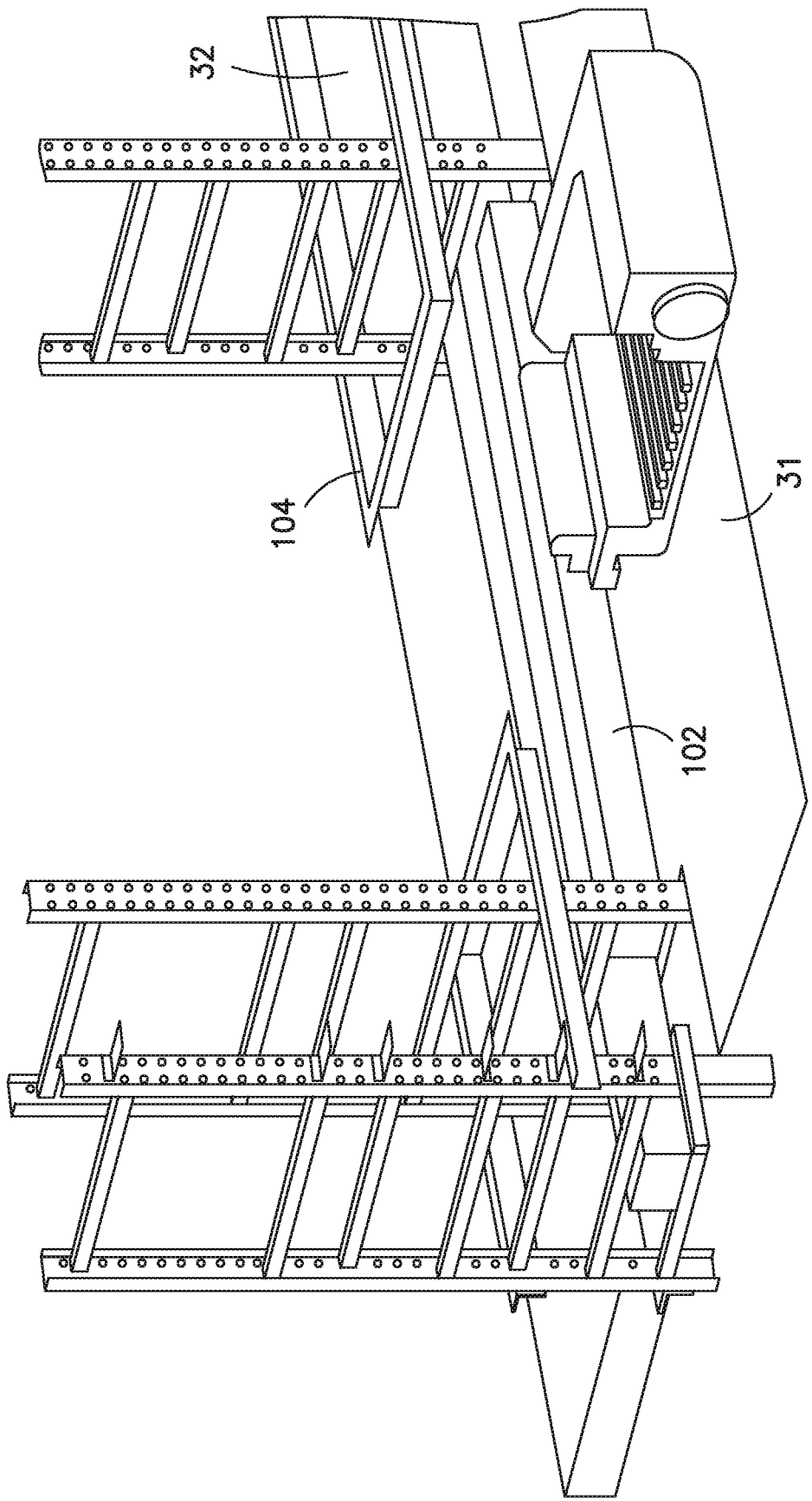

As may be realized, and previously described, personnel access into the storage array and transport or rover space (e.g. decks and aisles at each level of the array) is desired for both planned activity (i.e. any planned human interaction such as planned maintenance of systems of the array, access to bots at human interface stations, etc.) and reactive activity (such as response to a rover impairment or disablement, reactive maintenance, etc.) or any other reason demanding that personnel enter the ASRS space. This is effected by providing control, shielding and security features throughput the hardware, system and process paths which together may be considered as a chain of inter connected links (see FIG. 1) that impact or affect personnel access to the ASRS to satisfy the category criteria provided by IEC 61508, SIL-3. Accordingly, the ASRS 10, and more specifically the storage array and transport space (e.g. decks, aisles) is configured to define personnel access zones 100 (100A-100n), see FIG. 1, with controlled openings for human access into each zone, and controlled closures to openings that are closed to prevent entry of automated mechanisms or rovers into an access zone that has been open to personnel access. The access zones 100-100n may be distributed to cover all machinery space, storage array space and transport space. Size and distribution of access zones may vary as desired, and ASRS machinery components that are substantially fixed (e.g. MVC's, rover lift, conveyors, etc.) may have separate and dedicated access zones. Referring now to FIG. 4, there is shown a side elevation view of a portion of the storage array and transport space of the ASRS and illustrating a representative distribution of access zone(s) for that space (in other aspects more or fewer access zones may be used). In the exemplary embodiment, each access zone may extend to encompass aisles (or portions thereof) corresponding to one or more levels, and multiple zones 100A1, 100A2 may be used along the length of a given aisle. Similarly, access zones may encompass decks, or portions thereof, at one or more levels of the array (see FIG. 3). If desired an access zone may encompass both deck space and aisles at one or more levels, or may be delimited along aisles and deck portions respectively. As may be realized, and will be described further, each access zone is separate and segregated from others, including adjacent access zones, so that security and continued access is provided for each zone individually. Thus, personnel access is provided for each individual zone, and conversely ASRS operations in other zones 100 that are unsecured may continue substantially uninterrupted. By way of example, zone 100A2, in FIG. 4, may be secured and controlled to allow personnel access to rover aisles therein, and the unsecured zones including adjacent zone 100A1, may continue operation. The access zones may be sized and shaped so that no zone, when secured, disrupts operation of more than one module of the ASRS system, and other modules including adjacent modules may continue substantially unimpaired (e.g. securing of an access zone in one module, such as the deck access zone 100D in module 2, shown in FIG. 3B, does not block rovers from accessing storage locations on aisles 32 and moving along deck portion 31 to lifts 34 in module 1). As noted before, each access zone has corresponding controllable closures 102, 104 that close rover access ways, such as in corresponding aisles or decks, examples of which are illustrated in FIGS. 3B and 4A. Generally the structure of the access zones may be similar to the access zones shown and described in U.S. patent application Ser. No. 13/326,565, filed Dec. 15, 2011, incorporated by reference herein in its entirety. Actuable closures may be of any suitable configuration and may be power actuated or manually actuated (via suitable linkage from outside the access zone). Exemplary closures for aisle and deck access are illustrated in FIG. 4A. Other suitable examples of closures for aisle and deck access can be found in U.S. patent application Ser. No. 13/326,565 noted above. Actuable closures may further include suitable sensors 400 to indicate open/closed states to the control system 14, and may include if desired interlocks 401 preventing actuation of the personnel closure of the given access zone if any (one or more) of the rover access closures (aisle, or deck) are not closed and access not secure.

Figure 2:
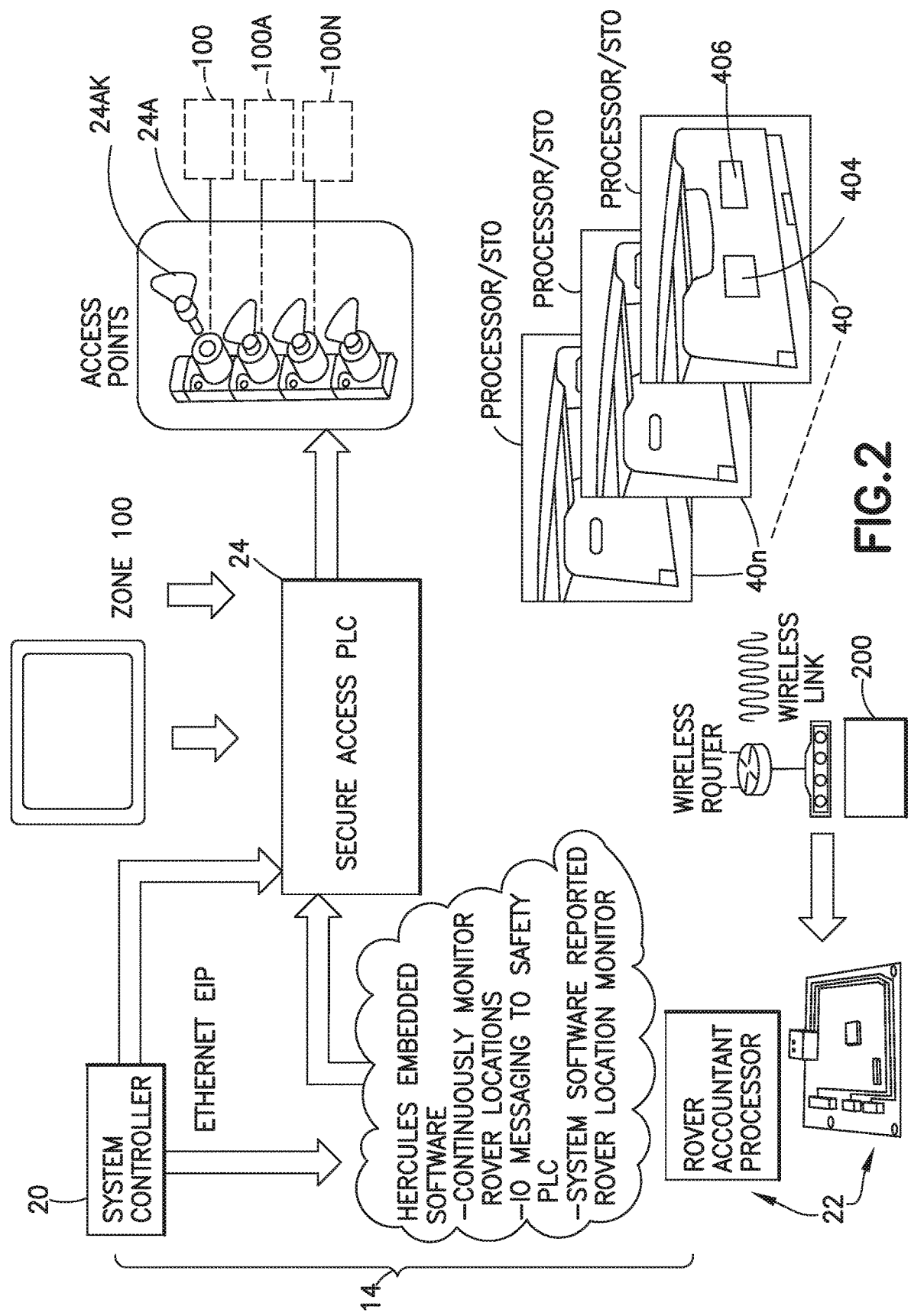
FIG. 2 is a schematic illustration of a portion of a control system of the ASRS shown in FIG. 1 and the interface thereof with other components of the ASRS.
Figure 2A:
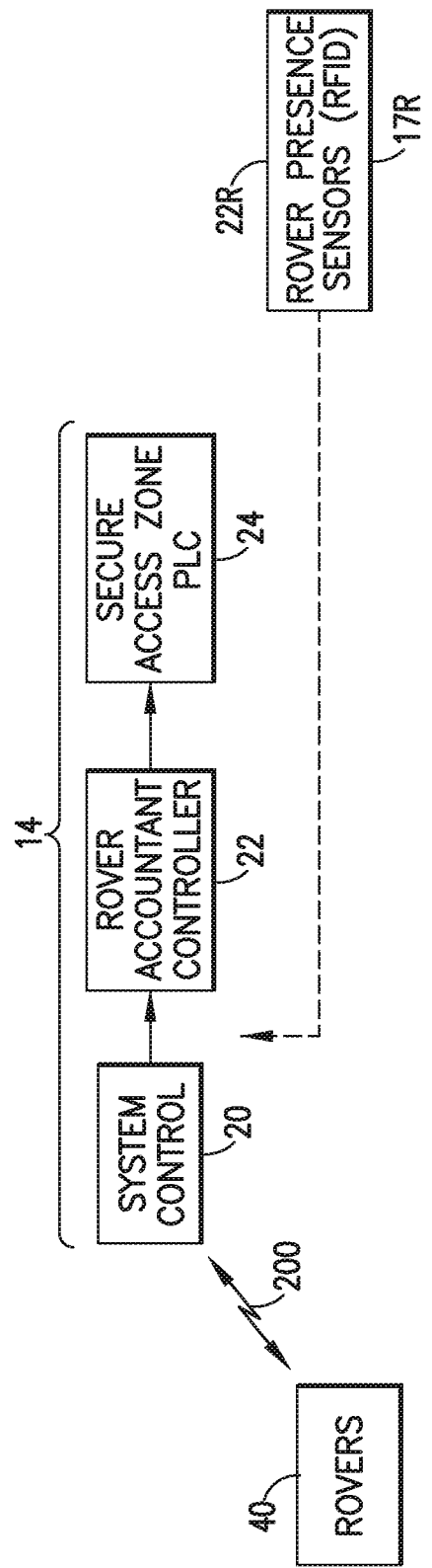
FIG. 2A is another diagram showing another portion of the control system and interface with ASRS rovers.
Figure 5:
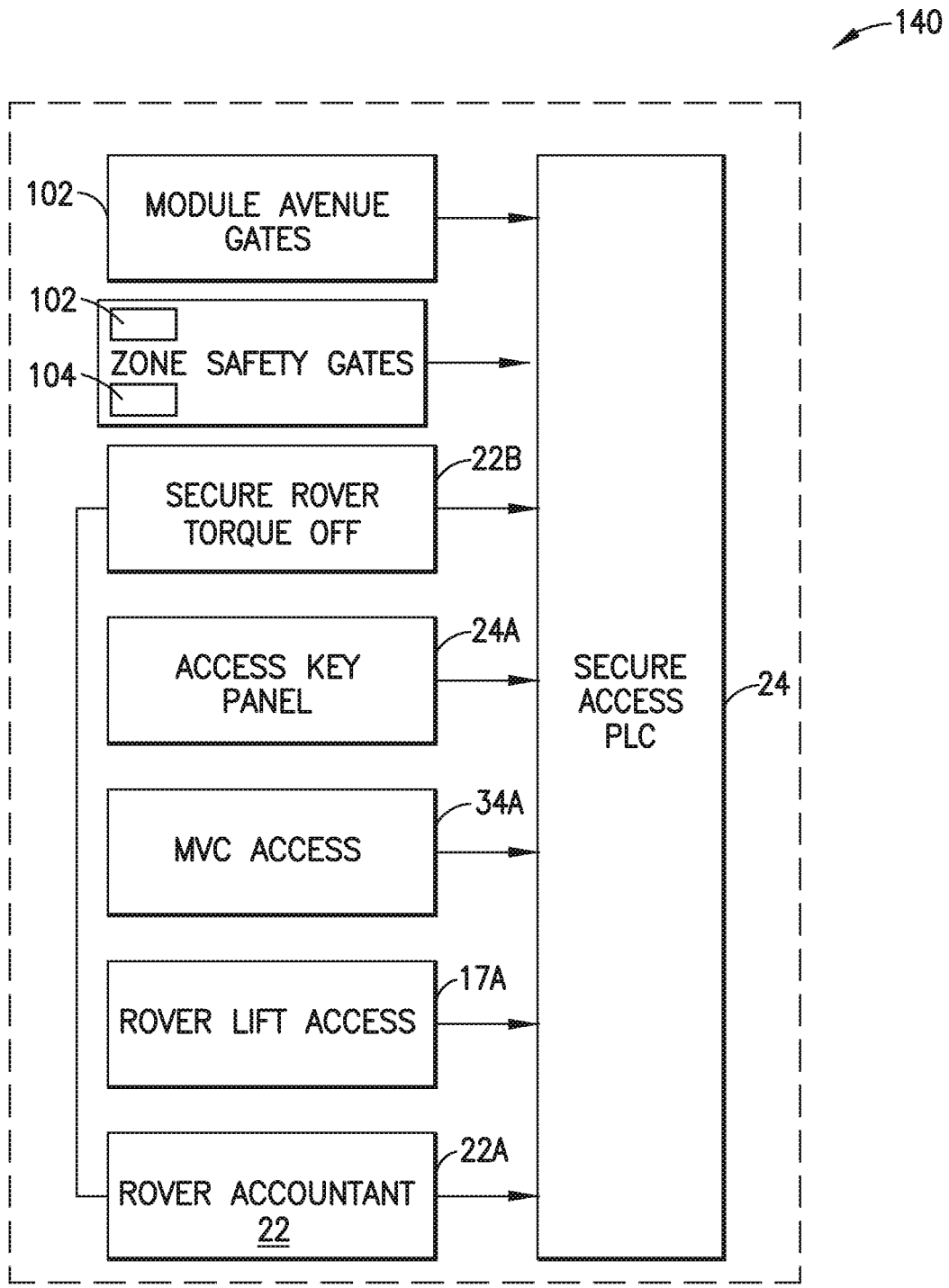
FIG. 5 is a schematic diagram of another portion of the control system configured for controlling accessing of the personnel access zones.

Referring now again to FIGS. 1-2, and also to FIG. 2A, in the exemplary embodiment the control system 14 may include a secure access zone PLC 24 (of any suitable type) that is connected to communicate with other control components/processors, and to provide commands to operative elements to permit or close access to each zone in response to appropriate inputs. The secure access zone PLC may use any suitable communication protocol (e.g. TCP/IP) for communication with other controllers. As also shown in FIG. 2, lockout/tag out panels 24A may be provided at one or more desired locations of the storage array and be operably connected to the secure access PLC. Referring now to FIG. 5, there is shown a schematic diagram of a portion of the ASRS control system 14, and more specifically the secure access PLC 24 and the communication inputs to the PLC (e.g. state indication of the aisle and deck gates 102, 104, state indication of personnel to access zone 24A, and other access input for MVC and rover lift, etc. corresponding to each given access zone). Input data or information may be provided direct from sensor(s), such as sensor 400, or via another suitable portion(s) of the control system. As seen also in FIGS. 2 and 5, the secure access PLC 24 in the exemplary embodiment further receives inputs 22A, 22B regarding rover status and rover security in order to satisfy control and security concerns related thereto before commanding or enabling release of access to a desired access zone. As may be realized, even if closures to a zone are secured, this provides no information regarding the presence and/or state of any rovers in a given access zone to which access is desired. As may be further realized, in view of the configuration of each access zone, as described before, relevant information as to rover presence and state is desired only for such rovers present in the desired zone when access is sought, as determined by the system 14 as will be described below.

Figure 8A:
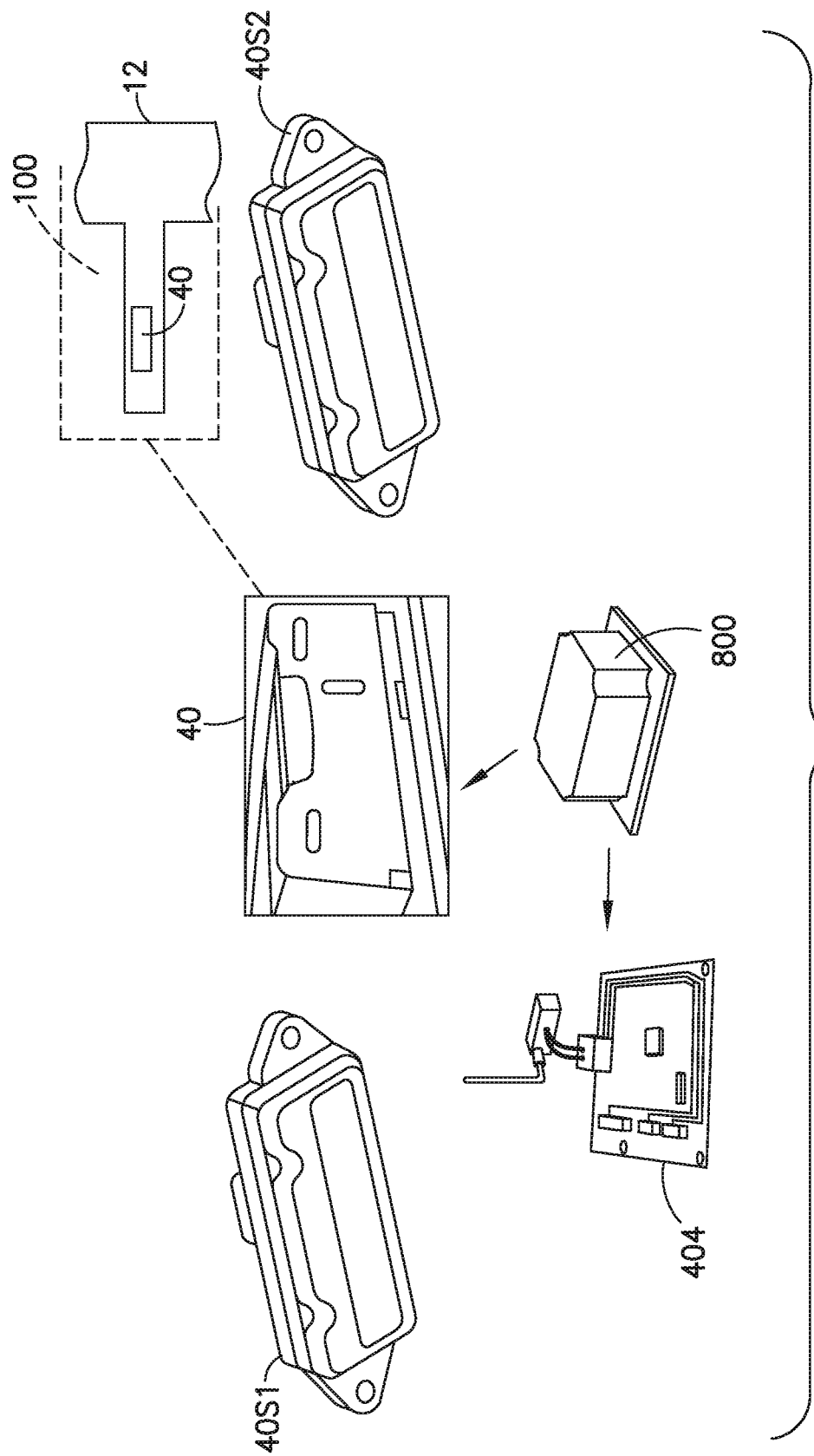

As seen in FIGS. 2-2A, in the exemplary embodiment the ASRS system control 14 may include the rover accountant processor/controller 22 (generally referred to as rover accountant 22) that may account for rovers with respect to the access zones 100 encompassing the transport or rover space. In other words, the rover accountant 22 may account for at least the location of every rover 40 in a given access zone at a given time and communicate access permission to a secure access zone PLC 24 with respect to an access key 24AK as will be described below. The rover accountant 22 may register the rover location or state (in or out (e.g. not in)) of the rover with respect to any or each access zone independent of rover position registration by any other controller of the ASRS control system. By way of example, the rover accountant 22 may be suitably programmed (e.g. with a table or map) with all access zones encompassing the ASRS transport space. The access zone representations in the rover accountant 22 may be positionally related to each other (e.g. position matrix) but may or may not be related by the rover accountant to coordinates in the transport space (e.g. may not be realized with respect to deck or aisle coordinates). The rover accountant 22, may register and account for a rover state of each rover 40 with respect to each or any access zone separately, and if desired independently of other rover position registration effected by the ASRS control system controllers. As may be seen in FIG. 3B, in the exemplary embodiment, rover presence sensors 22R (e.g. RFID readers, scanners, etc.) may be provided at the access openings at access zone interface/or access zone boundaries. For example, the rover presence sensors 22R may be positioned proximate to location of closures (and may include rover lift sensor 17R described before) and may be disposed to identify directional information of the rover (rover entering/leaving given access zone) in addition to rover identity and presence at the location. The presence sensor 22R may have a passive sensor element (RFID for example) mounted to the rover and active element (e.g. reader) on the structure or vice versa. In accordance with another aspect of the exemplary embodiment, location data from the rover sensors 40S1, 40S2 (FIG. 8A) employed by the rover 40 for determination of rover pose and navigation (see FIG. 8A) may also be employed, in combination with the rover presence sensors 22R to inform the rover accountant 22 of the rover state relative to access zone. As may be realized, pose determination (e.g. Hall effect, line detector(s), accelerometers, gyroscopes, RFID readers, etc.) sensors 40S1, 40S2 on the rover may detect corresponding location determination features on the transport space structure, and various such location determination features may be arranged to correspond to position state or change thereof of the rover (i.e. in/out and direction) with respect to any desired access zone. Accordingly, the rover accountant may separately account for each rover in each access zone of the ASRS. Hence, when personnel access is desired to a given access zone, such as by making a request via a suitable input interface, to the ASRS control system, the rover accountant may independently determine when all (or which) rovers have been evacuated from the given access zone, and if and which rovers remain un-evacuated in the access zone. If all rovers are evacuated from the access zone, the rover accountant 22 may send a suitable signal (e.g. using "black channel" communication) to the secure access PLC 24 (see FIGS. 2 and 5) that all rovers are evacuated and the access zone is secure and rover free. The secure access PLC 24, upon receipt of other secure signals (see FIG. 5) may command release of the lockout/tag out panel key 24AK for the corresponding access zone(s). As may be realized, un-evacuated rovers in the access zone accounted for by the rover accountant 22, will be secured by verifiably shutting down the rover motors or actuators (e.g. the electro-mechanical systems, such as drive(s)/motor actuator(s) 800, of the rover are disabled to prevent subsequent movement of the rover) otherwise referred to as secure torque off as will be further described. In one aspect the rover accounting and the rover secure torque off may be implemented in accordance with IEC 62061 (incorporated herein by reference in its entirety) to achieve SIL 3 category criteria with a life of about twenty years, while in other aspects the live may be more or less than about twenty years. Verification that the electro-mechanical systems of the rover 40 are disabled may be sent to the rover accountant 22 by, for example, in any suitable manner, such as by a secure torque off processor 404 which may or may not be part of the rover controller 406.

Figure 7A:
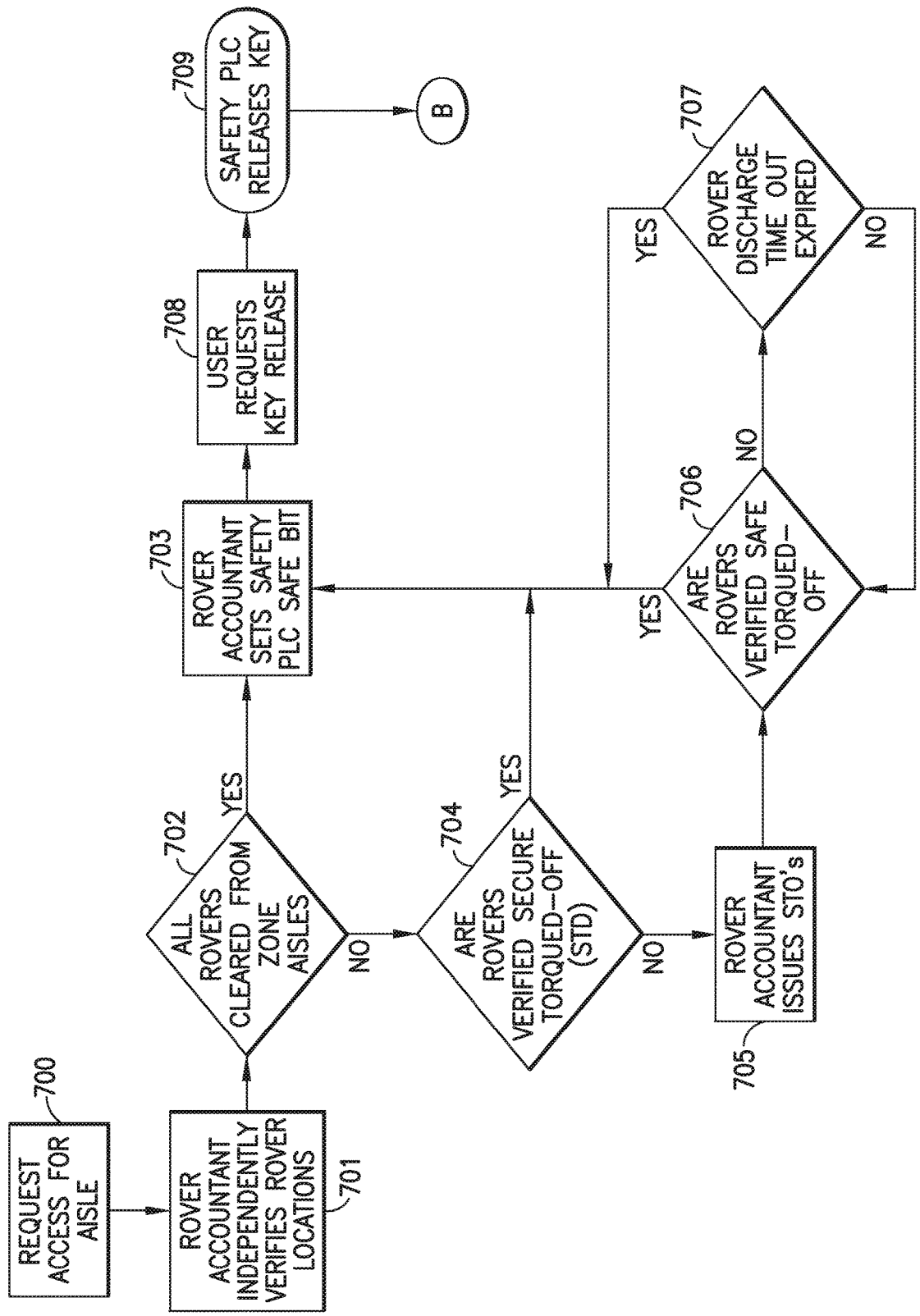
FIGS. 7A and 7B are a block diagram schematically illustrating a process for securing and controlling access to a desired personnel access zone in accordance with features of the exemplary embodiment.
Figure 7B:
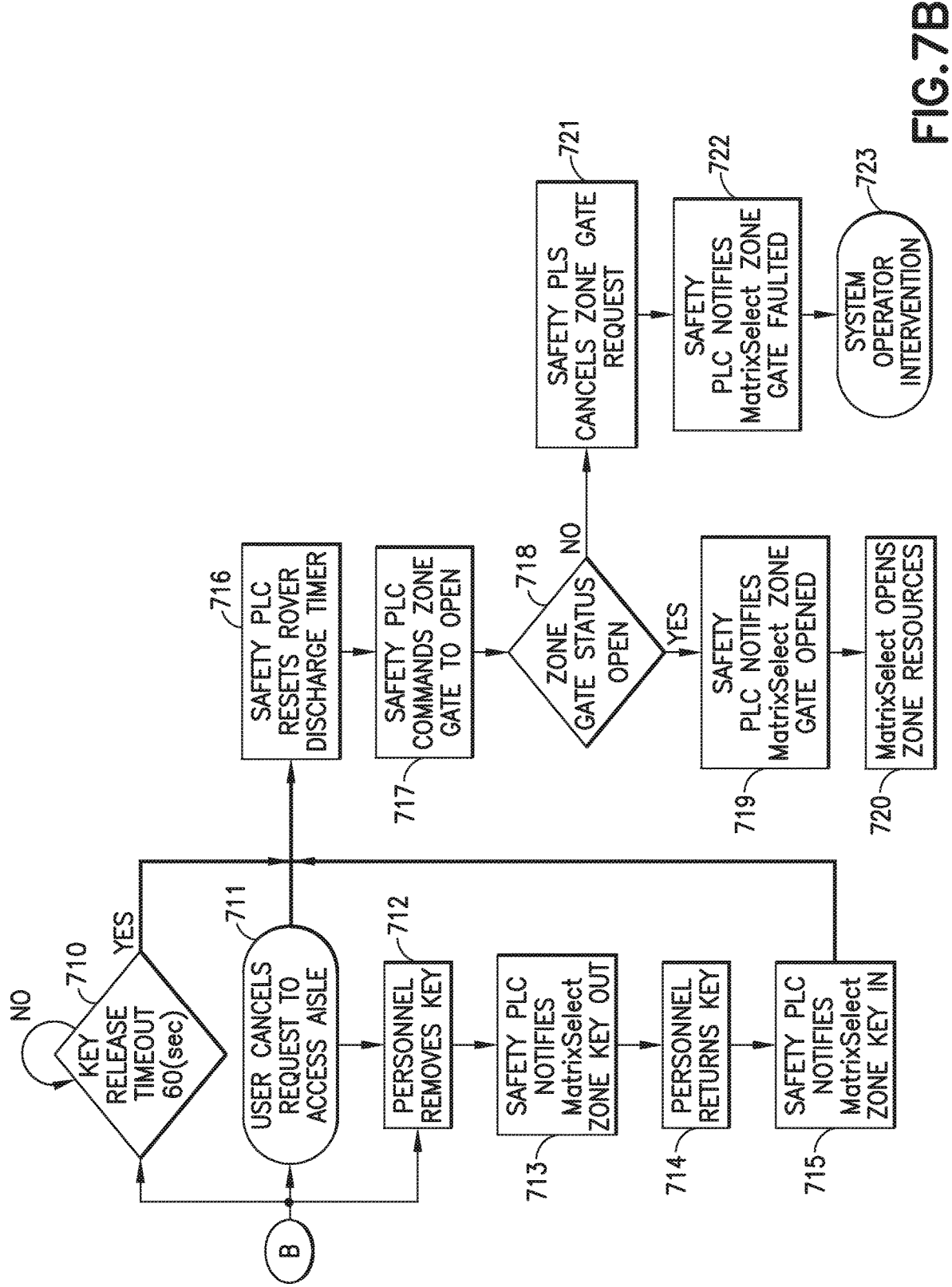

The process for securing an access zone is generally similar for each access zone, as well as for deck and aisle access zones. Referring to FIG. 7, there is shown a graphic representation of the process for securing an aisle access zone. Generally, the process may be as follows. An operator seeks access to the access zone, such as for accessing a stranded rover. The operator may input an access request for a predetermined aisle in any suitable manner such as through the secure access zone PLC 24 and/or controller 20 (Block 700), and in response thereto the system controller commands the rovers in the zone to evacuate the zone. As may be realized the system controller may not have information regarding which rovers are in any given zones, and may simply command all rovers to depart a given portion of the transport space.

The system controller 20, as seen in FIG. 2A, may communicate with the rovers 40 via a suitable remote communication system 200 (e.g. wireless communication) using any suitable protocol such as Ethernet/IP. Those rovers located in the given portion, are aware (such as by virtue of self-navigation capability) of their presence in such portion, and initiate navigation for and depart (if they can). As noted before, the rover accountant may be separately aware of which rovers are in the given access zone to which access is sought, and separately registers departures and accounts for rovers evacuating the access zone (Block 701). If all possible rovers are cleared, closures may be closed and verified (Block 702) and the rover accountant 22 may indicate safe access to a desired access zone with the secure access zone PLC 24 (Block 703). As may be realized and noted before, un-evacuated rovers, though accounted for by the rover accountant as remaining in the access zone, are nonetheless secured by verified means that effect secure shutdown of the rover motors and actuators, referred to herein as secured torque off. For example, the rover accountant may communicate with the rover(s) remaining in the access zone using, for example, an end to end safety communications channel for communications (as described herein), to independently verify secured torque off of the rover(s) (Block 704). If secure torque off is verified the rover accountant 22 may indicate safe access to a desired access zone with the secure access zone PLC 24 (Block 703).

Figure 6:
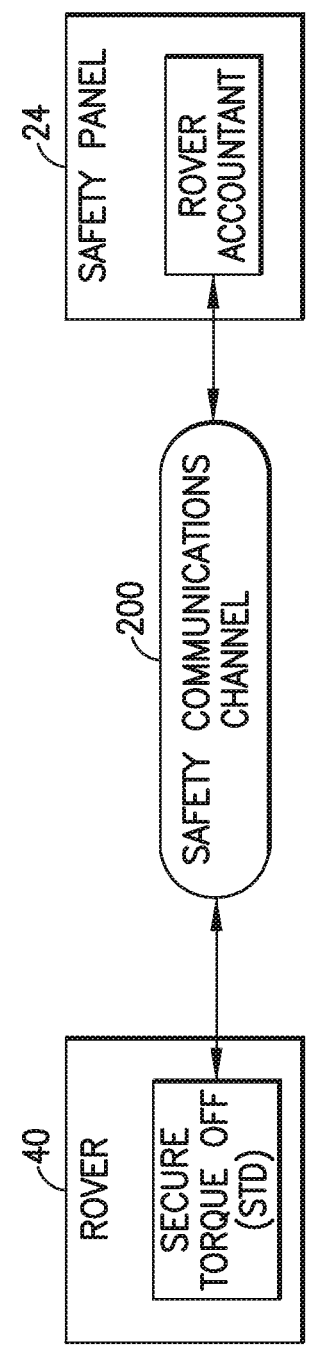
FIG. 6 is a schematic diagram of a portion of the ASRS.

In accordance with one aspect of the exemplary embodiment, if secure torque off is not verified, the rover accountant 22 is configured to communicate with the unevacuated rover (though it may communicate as such with each and every rover) to command and effect secured torque off from the rover (Block 705). As seen in FIG. 2A and FIG. 6, in accordance with an aspect, the rover accountant 22 may communicate shutdown commands to the rover(s) 40 via the same remote communication system 200 and links as the system controller 20, but may employ "black channel" communication over the base communication protocol such as Ethernet/IP or TCP/IP (a suitable example of "black channel" communication is CIP Safety™, a network independent security protocol, though any other suitable security protocol may be used) to provide for robust security and verification of the secure torque off command transmission sent by the rover accountant and as received by the intended rover. In accordance with an aspect of the exemplary embodiment, the communication state between the rover accountant and each of the rover(s) 40 is normally closed. A communication link over the remote communication system 200, may be opened to those rover(s) 40 (one or more) specifically for, and may be substantially coincident with, the rover accountant commanding the identified rover(s) to shutdown (i.e. secure torque off). Subsequent to transmission of the command, and then subsequent verification from the affected rover 40 back to the rover accountant 22 that secure torque off (i.e. secure and verified shutdown) has been effected by the rover (Block 706), the bi-directional communication link is closed. Once verified, the rover accountant 22 may indicate safe access to a desired access zone with the secure access zone PLC 24 (Block 703). If secure torque off is not verified a rover discharge timeout is checked (Block 707) and if a rover power supply is verified as being discharged the rover accountant 22 may indicate safe access to a desired access zone with the secure access zone PLC (Block 703). If the rover power supply is not verified as being discharged the rover accountant may again verify secure torque off (Block 706) and when verified indicate safe access to a desired access zone with the secure access zone PLC 24 (Block 703).

Figure 9A:
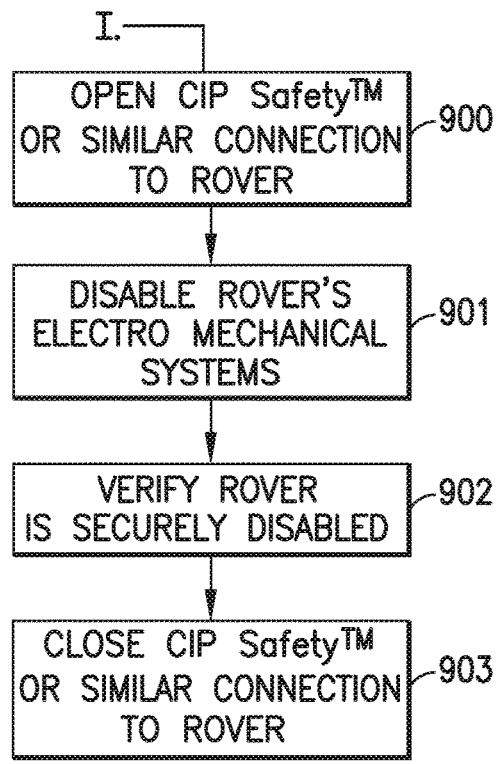
FIGS. 9A-9B respectively are further block diagrams each graphically illustrating a process or part thereof in accordance with features of the exemplary embodiment.

Referring also to FIG. 9A, there is shown a block diagram graphically illustrating a process (I) for securing the rover. In one aspect the rover accountant 22 may open a suitable communication channel, such as those described above, with the rover(s) 40 (Block 900). The rover accountant 22 may issue commands to the rover(s) 40 to disable or otherwise shutdown one or more electromechanical systems, e.g. such as wheel drives, end effector drives, etc. (Block 901). As noted above, the rover accountant 22 may verify that the rover(s) is securely disabled (Block 901—see also Block 704) and, once secure torque off is verified, close the communication channel with the rover(s) (Block 903).

Upon completion of maintenance or for any other suitable reason, the personnel may request a key release at the lockout/tag out panel 24A (Block 708) and the secure access zone PLC 24 may release the key 24AK (Block 709). The personnel may remove a predetermined lockout/tag out key 24AK (see FIG. 2) (Block 712). In response to the removal of the key 24AK, the secure access zone PLC 24 may notify, for example, the system controller 20 that the key 24AK for a predetermined maintenance access zone or ASRS module has been removed from the lockout/tag out panel 24A (Block 713). The personnel may return the key 24AK to a predetermined location (Block 714) where the key 24AK is identified by the secure access zone PLC 24 as being returned and the system controller 20 is notified that the key 24AK has been returned (Block 715). In one aspect, a key release timeout loop may be provided (Block 710) such that the loop continues to run until the lockout/tag out key 24AK has been removed. In another aspect, the personnel may cancel the request to access the aisle (Block 711). In response to one or more of the key release timeout identifying the lockout/tag out key 24AK has been removed, the cancellation of the request for aisle access and the personnel removing the key 24AK, the secure access zone PLC 24 may reset a rover discharge timer (Block 716) and command the access gate(s) 104 for the aisle to open (Block 717). The secure access zone PLC 24 may verify that the access gate(s) 104 are opened in any suitable manner (Block 718) such as with any suitable sensors. The secure access zone PLC 24 may notify, for example, the system controller 20 that the access gate(s) are open (Block 719) and the system controller 20 may open the resources (e.g. rovers 40, rover lifts 17, lifts 34, rover chargers, etc.) of the previously secured aisle access zone (Block 720).

Figure 9B:
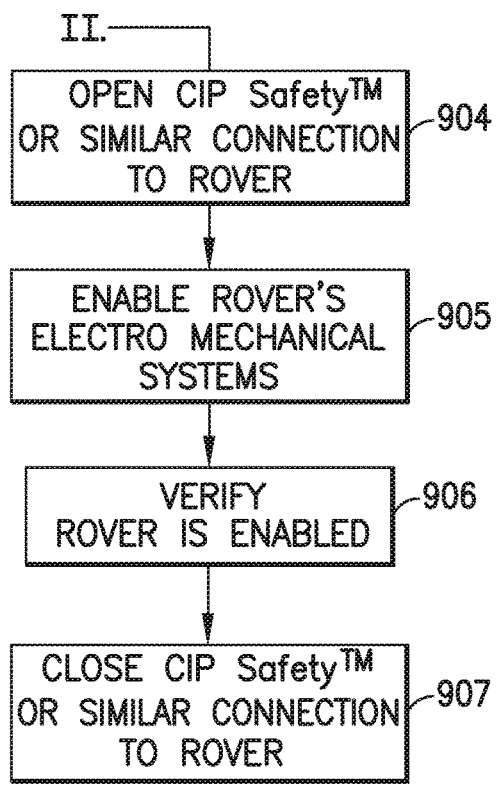
Figure 10A:
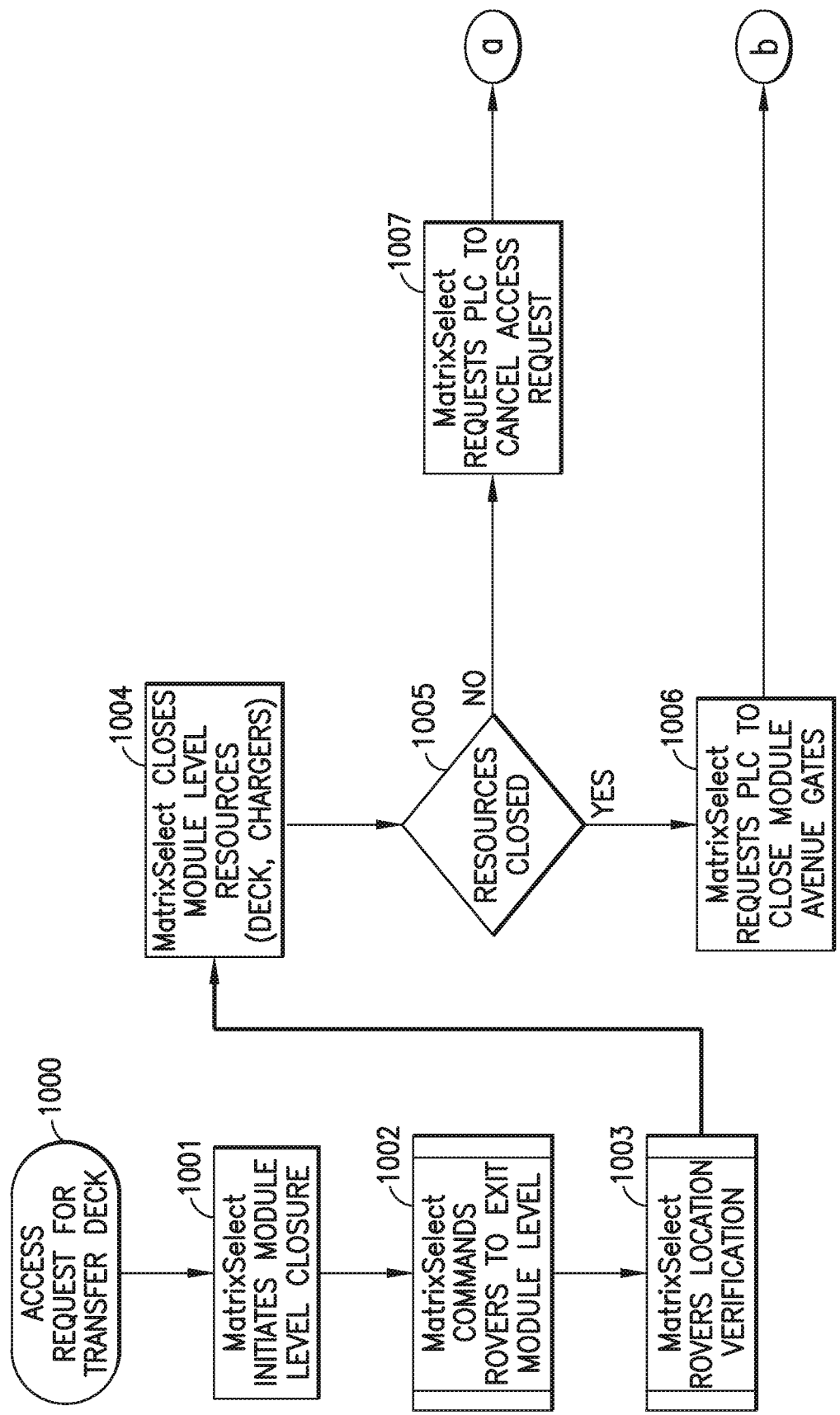
FIGS. 10A-10D respectively are further block diagrams each illustrating a corresponding process in accordance with the exemplary embodiment
Figure 10B:
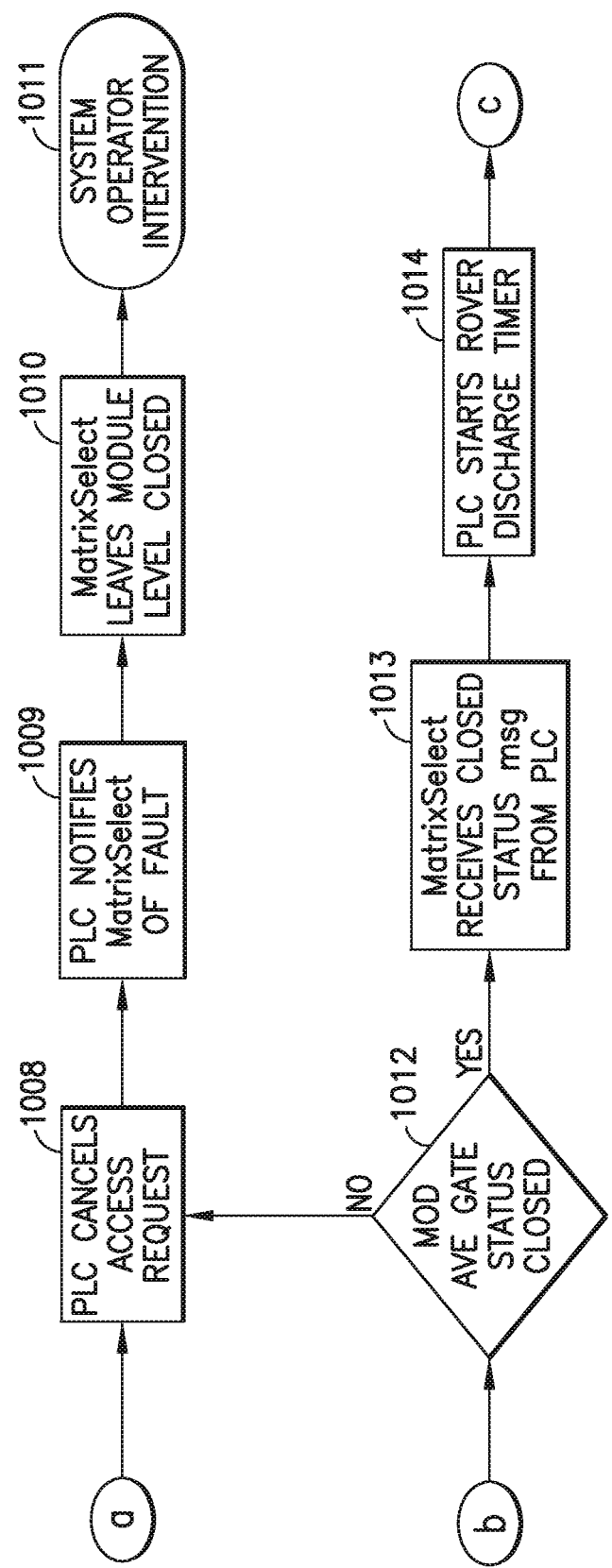
Figure 10C:
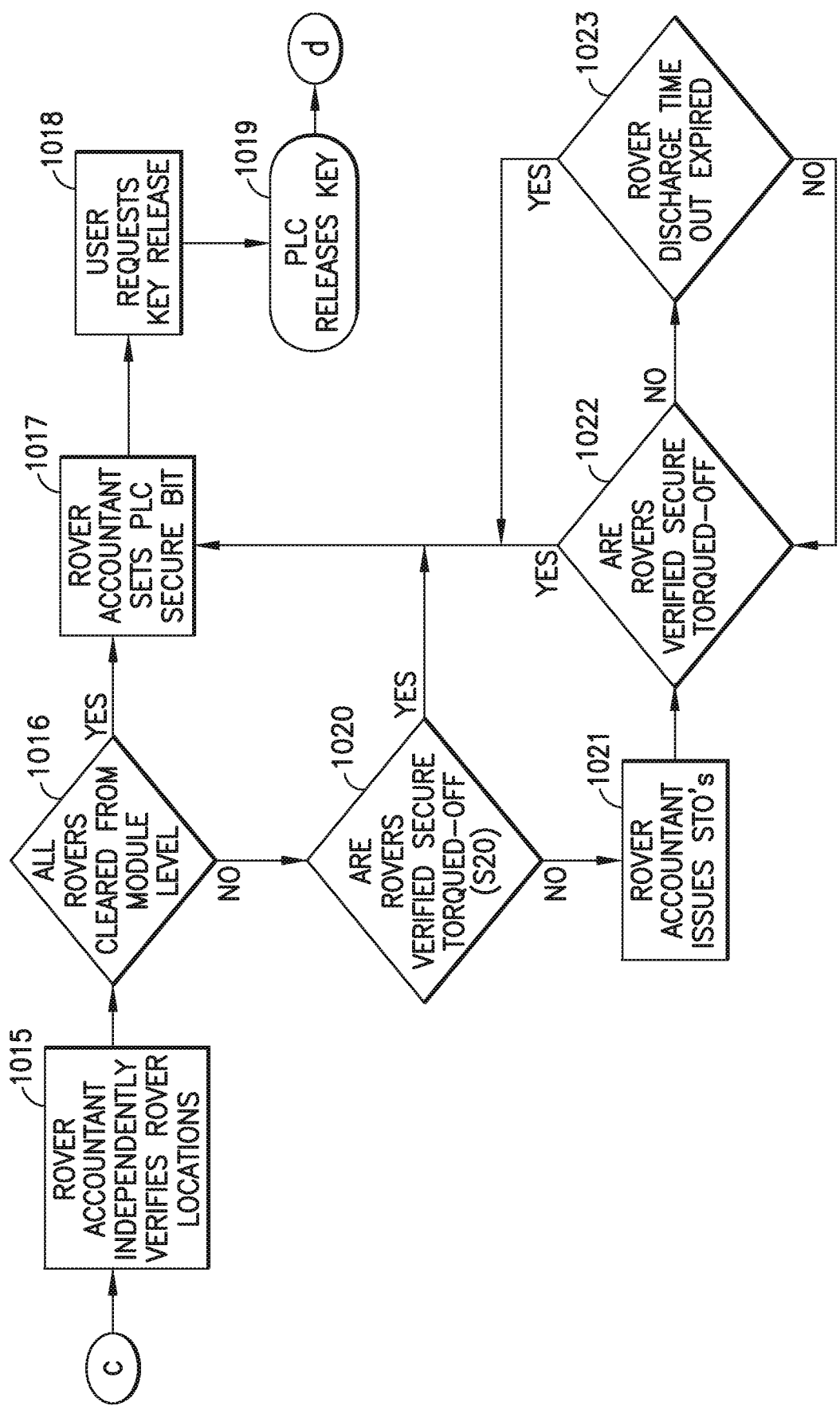
Figure 10D:
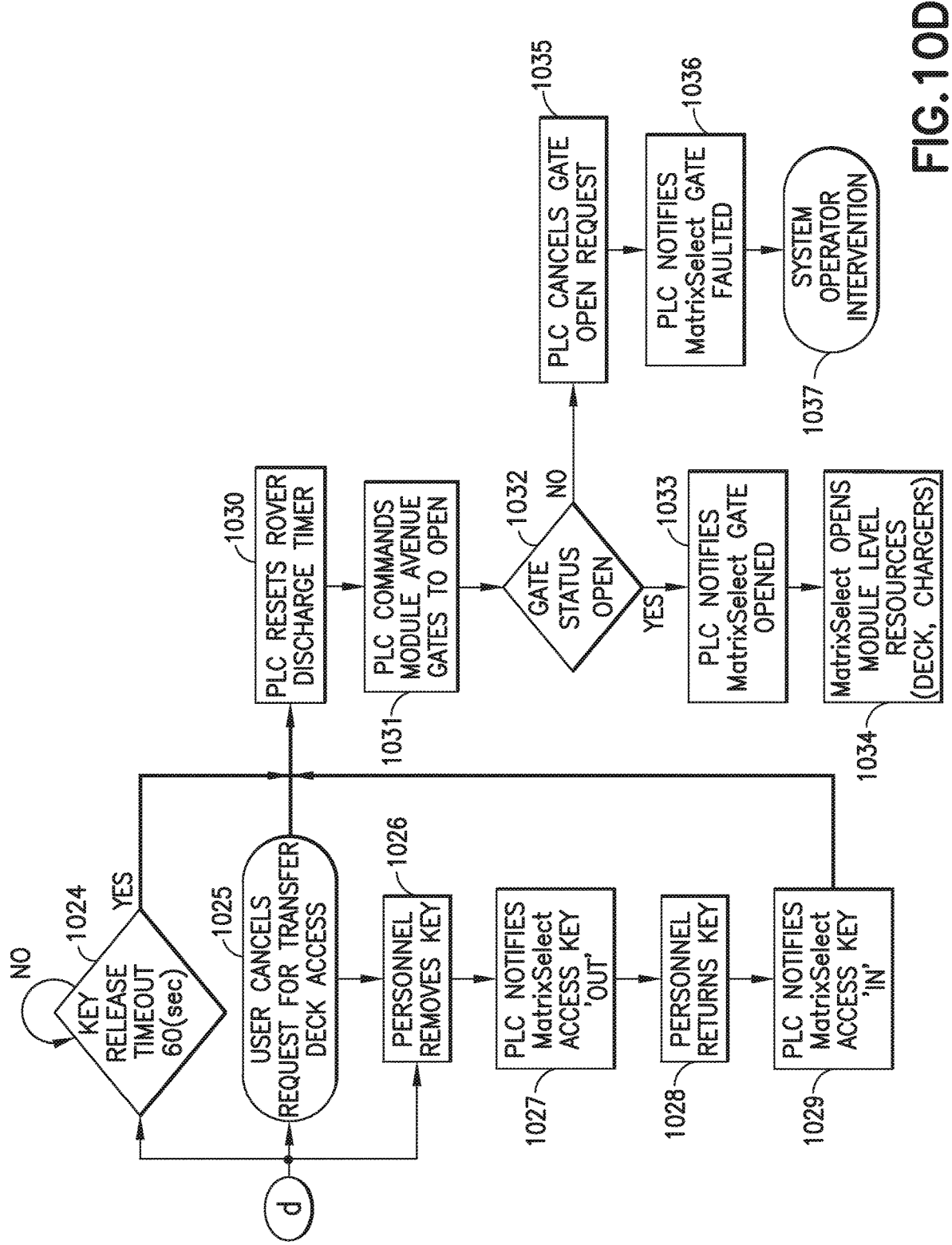

It is noted that the process for activating a secured rover is substantially similar, but in the opposite sense and is graphically illustrated in FIG. 9B. For example, in one aspect the rover accountant 22 may open a suitable communication channel, such as those described above, with the rover(s) 40 (Block 904). The rover accountant 22 may issue commands to the rover(s) 40 to enable or otherwise turn on the one or more electromechanical systems of the rover(s) (Block 905). The rover accountant 22 may verify that the rover(s) is enabled (Block 906) and, once an enabled status is verified, close the communication channel with the rover(s) (Block 907).

In one aspect, where the secure access zone PLC 24 determines that the access gate(s) are not open the secure access zone PLC 24 may cancel the request to the module or access zone to open the access gates (Block 721) and notify the controller 20 that there may be fault with the access gate(s) in the aisle access zone (Block 722). The controller 20 may provide any suitable indication to notify personnel of the fault with access gate(s) for resolution of the fault (Block 723).

Figure 8C:
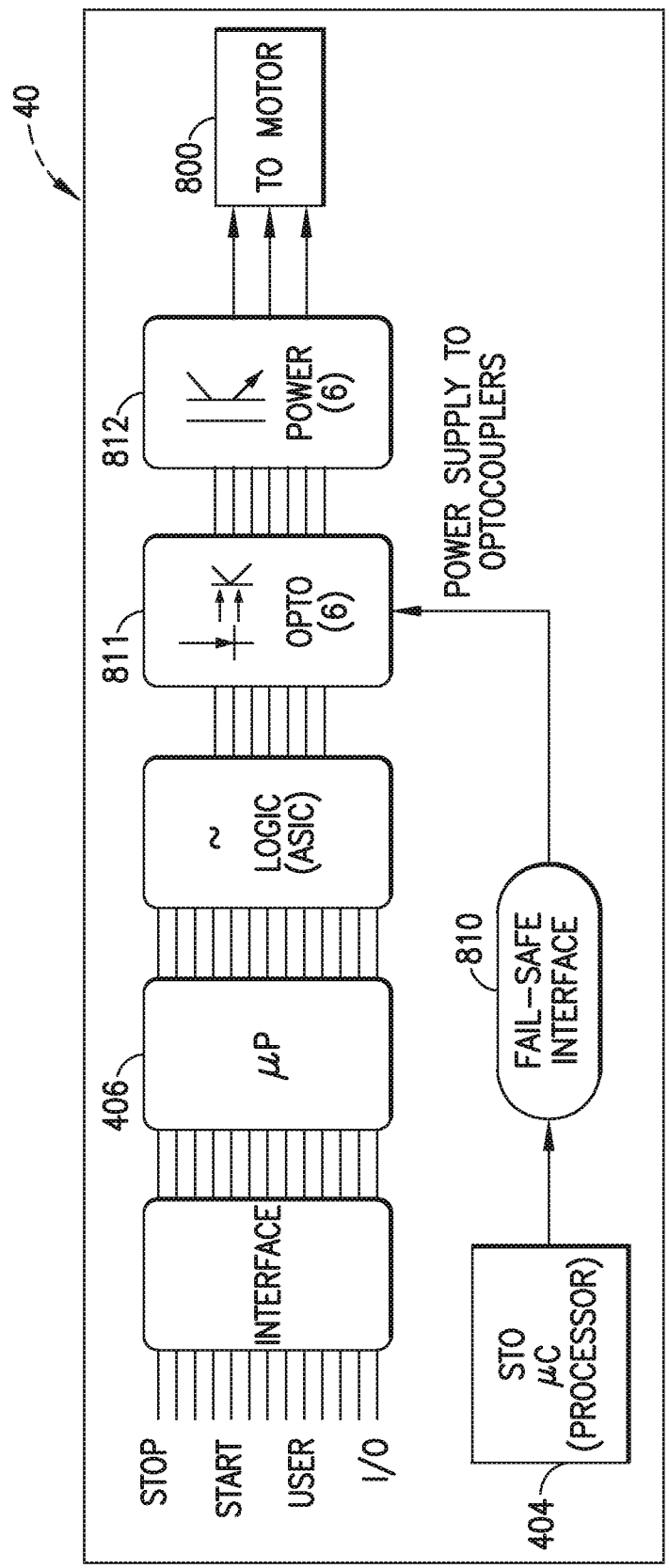

In an aspect of the exemplary embodiment the rover controller system 402, resident on the rover 40, (see FIG. 8B) and its interface systems to the power supply and motor actuators (see FIG. 8C) may be configured so that components, system and process of the rover form what may be considered to be a performance chain effecting secure torque off, with verification and security characteristics that conform with those from the command generation and transmission at the rover accountant 22. Thus the linked processes, systems and components from rover accountant 22 to rover motor actuators responsive to the shutdown command define a secure and verified shutdown system (otherwise referred to herein as secure torque off) that may comply with IEC 61508, SIL 3 category criteria. More specifically and with reference to FIGS. 8B-8C, the rover may include a secure controller 404 (such as a TI Hercules process or (or similar)) that is coupled via a 3 port Ethernet switch to a WiFi bridge and rover CPU/controller 406 (that effects rover general operation). In one aspect the controller code for secure controller 404 may be independent from the controller code for controller 406. It is the rover secure controller 404 that effects secure torque off of rover motors actuators. The rover secure torque off commands, from the rover accountant, and communicated over the WiFi bridge to the affected rover are routed to the rover secure controller 404. In response to the secure torque off command signals input thereto, the rover secure controller 404 in turn processes suitable control signals over a dedicated fail-safe interface 810 to couplers 811 (see FIG. 8C) that securely and verifiably shutdown power 812 to the motor actuators 800. In one aspect the couplers may be opto-couplers that control motor field-effect transistor(s) gate inputs where power to the motor actuators 800 is disabled by disabling the gate inputs to the field-effect transistors. In other aspects power to the motor actuators 800 can be disabled in any suitable manner. In one aspect the fail-safe interface 810 may provide redundant control of the opto-coupler power where cutting power to the opto-couplers disables the field-effect transistors. The fail-safe interface 810 may also include status feedback for opto-coupler power, motor drive fault conditions and/or any other suitable feedback data. Suitable signals of shutdown are communicated to the rover secure controller 404, and which in turn are communicated via the "black channel" communication link to the rover accountant 22. Upon confirmation of rover secure torque off of the unevaluated rover(s) the rover accountant signals the same to the secure access PLC 24 (see FIG. 7).

Similar processes are graphically (illustrated in FIGS. 10A-10D for securing and opening deck zones. For example, a request for access to a transfer deck may be made by, for example, the secure access zone PLC 24 or personnel in any suitable manner (Block 1000). Any suitable controller, such as controller 20 and/or secure access zone PLC 24, for the ASRS module for which access is requested may initiate the closure of at least part of the storage level on which the transfer deck is located (Block 1001). The controller 20 may communicate with the rover(s) on that level in any suitable manner, such as described above, and sends commands to the rover(s) to exit the transfer deck for which access is requested (Block 1002). The controller 20 may verify the locations of the rover(s) in any suitable manner (Block 1003) and close or otherwise shutdown the level resources (e.g. rovers 40, rover lifts 17, lifts 34, rover chargers, etc.) (Block 1004).

The controller may verify that the resources are shutdown in any suitable manner such as any suitable sensors (Block 1005). If the controller 20 determines that one or more of the resources are not shutdown the control may request that the transfer deck access request may be cancelled (Block 1007). In response to the cancellation request the secure access zone PLC may cancel the request for transfer deck access (Block 1008) and notify personnel in any suitable manner that a fault has occurred when shutting down the level resources (Block 1009). The fault notification may identify the faulty resource such that the controller 20 maintains at least the portion of the level where the faulty resource is located in a closed or shutdown state (Block 1010) so that personnel can access the faulty resource to resolve the fault (Block 1011).

If the controller 20 verifies that the level resources are shutdown the controller requests that the secure access zone PLC 24 close the gate(s) 102 corresponding to at least the area of the transfer deck for which access is requested (Block 1006). The secure access zone PLC 24 may verify that the gate(s) have been closed in any suitable manner, such as with any suitable sensors (Block 1012). If it is determined that the gates are not closed the secure access zone PLC 24 may cancel the access request as described above with respect to blocks 1008-1011. If it is determined that the gate(s) are closed the secure access zone PLC 24 may inform the controller 20, in any suitable manner, that the gate(s) are closed (Block 1013) and the secure access zone PLC 24 may start a rover discharge timer (Block 1014).

In a manner substantially similar to that described above, the rover accountant 22 may be separately aware of which rovers are in the given access zone to which access is sought, and separately registers departures and accounts for rovers evacuating the access zone (Block 1015). If all possible rovers are cleared, closures may be closed and verified (Block 1016) and the rover accountant 22 may indicate safe access to a desired access zone with the secure access zone PLC 24 (Block 1017). As may be realized and noted before, un-evacuated rovers, though accounted for by the rover accountant as remaining in the access zone, are nonetheless secured by verified means that effect secure shutdown of the rover motors and actuators, referred to herein as secured torque off. For example, in a manner similar to that described above, the rover accountant 22 may communicate with the rover(s) remaining in the access zone to verify secured torque off of the rover(s) (Block 1020). If secure torque off is verified the rover accountant 22 may indicate safe access to a desired access zone with the secure access zone PLC 24 (Block 1017).

In accordance with one aspect of the exemplary embodiment, if secure torque off is not verified, the rover accountant 22 is configured to communicate with the unevacuated rover (though it may communicate as such with each and every rover) to command and effect secured torque off from the rover (Block 1021) s described above. Subsequent to transmission of the command, and then subsequent verification from the affected rover back to the rover accountant that secure torque off (i.e. secure and verified shutdown) has been effected by the rover (Block 1022), the bi-directional communication link is closed. Once verified, the rover accountant 22 may indicate safe access to a desired access zone with the secure access zone PLC 24 (Block 1017). If secure torque off is not verified a rover discharge timeout is checked (Block 1023) and if a rover power supply is verified as being discharged the rover accountant 22 may indicate safe access to a desired access zone with the secure access zone PLC 24 (Block 1017). If the rover power supply is not verified as being discharged the rover accountant may again verify secure torque off (Block 1022) and when verified indicate safe access to a desired access zone with the secure access zone PLC 24 (Block 1017).

Upon completion of maintenance on the transfer deck or for any other suitable reason, the personnel may request a key 24AK release at the lockout/tag out panel 24A (Block 1018) and the secure access zone PLC 24 may release the key 24AK (Block 1019). The personnel may remove a predetermined lockout/tag out key 24AK (see FIG. 2) (Block 1026). In response to the removal of the key 24AK, the secure access zone PLC 24 may notify, for example, the system controller 20 that the key 24AK for a predetermined maintenance access zone or ASRS module has been removed from the lockout/tag out panel 24A (Block 1027). The personnel may return the key 24AK to a predetermined location (Block 1028) where the key 24AK is identified by the secure access zone PLC 24 as being returned and the system controller 20 is notified that the key 24AK has been returned (Block 1029). In one aspect, a key release timeout loop may be provided (Block 1024) such that the loop continues to run until the lockout/tag out key has been removed. In another aspect, the personnel may cancel the request to access the aisle (Block 1025). In a manner similar to that described above, in response to one or more of the key 24AK release timeout identifying the lockout/tag out key 24AK has been removed, the cancellation of the request for aisle access and the personnel removing the key 24AK, the secure access zone PLC 24 may reset a rover discharge timer (Block 1030) and command the access gate(s) 102 for the transfer deck to open (Block 1031). The secure access zone PLC 24 may verify that the access gate(s) 102 are opened in any suitable manner (Block 1032) such as with any suitable sensors. The secure access zone PLC 24 may notify, for example, the system controller 20 that the access gate(s) are open (Block 1033) and the system controller 20 may open the resources (e.g. rovers 40, rover lifts 17, lifts 34, rover chargers, etc.) of the previously secured transfer deck access zone (Block 1034).

In one aspect, where the secure access zone PLC 24 determines that the access gate(s) are not open the secure access zone PLC 24 may cancel the request to the module or access zone to open the access gates (Block 1035) and notify the controller 20 that there may be fault with the access gate(s) in the aisle access zone (Block 1036). The controller 20 may provide any suitable indication to notify personnel of the fault with access gate(s) for resolution of the fault (Block 1037).

In accordance with one or more aspects of the disclosed embodiment a transportation system comprises a transportation space including destinations distributed in the transportation space; multiple independent automated vehicles configured for free roving through the transportation space to and between the destinations so that the vehicles are dynamically distributed through the transportation space, (each of the vehicles being arranged so that the vehicle effects independent navigation through the transportation space); a control system communicably connected via a remote communication link to each of the vehicles and having a system controller that addresses each vehicle to different destinations; and the control system having a vehicle accountant controller separate and distinct from the system controller and configured to independently register a dynamic location of at least one of the vehicles, selected from the multiple vehicles in the transportation space, and command shutdown, via the remote communication link, to only the selected at least one vehicle at the registered location if the registered location corresponds to a predetermined location.

In accordance with one or more aspects of the disclosed embodiment the predetermined location defines a zone in the transportation space segregated from another zone in the transportation space.

In accordance with one or more aspects of the disclosed embodiment the transportation space is three dimensional space with stacked levels, each level having at least one open deck and aisles for the vehicles to traverse, the aisles communicating with the deck so that the vehicles enter the aisles from the deck.

In accordance with one or more aspects of the disclosed embodiment the remote communication link is common to both the system controller and the vehicle accountant controller.

In accordance with one or more aspects of the disclosed embodiment the remote communication link is a wireless link.

In accordance with one or more aspects of the disclosed embodiment the vehicle accountant controller uses a black channel communication protocol over the remote communication link to command shutdown of the at least one vehicle.

In accordance with one or more aspects of the disclosed embodiment for transmission of the shutdown command to the selected at least one vehicle, the vehicle accountant controller opens communication between the accountant controller and the selected at least one vehicle over the remote communication link.

In accordance with one or more aspects of the disclosed embodiment the communication protocol of the shutdown command effects a secure and verified command on receipt by the selected at least one vehicle.

In accordance with one or more aspects of the disclosed embodiment the selected at least one vehicle is configured to effect secure and verified shutdown upon receipt of and in response to the shutdown command, and confirm shutdown to the vehicle accountant controller.

In accordance with one or more aspects of the disclosed embodiment the shutdown command as generated for communication by the vehicle accountant controller and received by the selected at least one vehicle, and the system of the selected at least one vehicle responsive to the shutdown command define a secure and verified remote shutdown system in compliance with IEC61508, SIL 3 category criteria.

In accordance with one or more aspects of the disclosed embodiment a communication state between the vehicle accountant controller and each of the multiple vehicles is normally closed and communication is opened by the vehicle accountant controller to the selected at least one vehicle in connection and substantially coincident with the vehicle accountant controller commanding shutdown to the selected at least one vehicle.

In accordance with one or more aspects of the disclosed embodiment the communication state is closed upon confirmation of shutdown of the selected at least one vehicle by the vehicle accountant controller.

In accordance with one or more aspects of the disclosed embodiment a communication state between the vehicle accountant controller and each of the multiple vehicles is normally closed and communication is opened by the vehicle accountant controller to the selected at least one vehicle in connection and substantially coincident with the vehicle accountant controller commanding activation of the selected at least one vehicle previously shutdown.

In accordance with one or more aspects of the disclosed embodiment a transportation system comprises a transportation space including destinations distributed in the transportation space; multiple independent automated vehicles configured for free roving through the transportation space to and between the destinations so that the vehicles are dynamically distributed through the transportation space, (each of the vehicles being arranged so that the vehicle effects independent navigation through the transportation space); a control system communicably connected via a remote communication link to each of the vehicles and having a system controller that addresses each vehicle to different destinations; and the control system having a vehicle accountant controller separate and distinct from the system controller and configured so that in response to being provided a predetermined location in the transport space the vehicle accountant controller independently registers a dynamic location of at least one of the vehicles corresponding to the predetermined location in the transportation space, and selectably commands shutdown, via the remote communication link, of only the at least one vehicle at the registered location (and not other of the vehicles).

In accordance with one or more aspects of the disclosed embodiment the predetermined location defines a zone in the transportation space segregated from another zone in the transportation space.

In accordance with one or more aspects of the disclosed embodiment the transportation space is three dimensional space with stacked levels, each level having at least one open deck and aisles for the vehicles to traverse, the aisles communicating with the deck so that the vehicles enter the aisles from the deck.

In accordance with one or more aspects of the disclosed embodiment the remote communication link is common to both the system controller and the vehicle accountant controller.

In accordance with one or more aspects of the disclosed embodiment the remote communication link is a wireless link.

In accordance with one or more aspects of the disclosed embodiment the vehicle accountant controller uses a black channel communication protocol over the remote communication link to command shutdown of the at least one vehicle.

In accordance with one or more aspects of the disclosed embodiment for transmission of the shutdown command to the selected at least one vehicle, the vehicle accountant controller opens communication between the accountant controller and the selected at least one vehicle over the remote communication link.

In accordance with one or more aspects of the disclosed embodiment the communication protocol of the shutdown command effects a secure and verified command on receipt by the selected at least one vehicle.

In accordance with one or more aspects of the disclosed embodiment the selected at least one vehicle is configured to effect secure and verified shutdown upon receipt of and in response to the shutdown command, and confirm shutdown to the vehicle accountant controller.

In accordance with one or more aspects of the disclosed embodiment the shutdown command as generated for communication by the vehicle accountant controller and received by the selected at least one vehicle, and the system of the selected at least one vehicle responsive to the shutdown command define a secure and verified remote shutdown system in compliance with IEC61508, SIL 3 category criteria.

In accordance with one or more aspects of the disclosed embodiment a communication state between the vehicle accountant controller and each of the multiple vehicles is normally closed and communication is opened by the vehicle accountant controller to the selected at least one vehicle in connection and substantially coincident with the vehicle accountant controller commanding shutdown to the selected at least one vehicle.

In accordance with one or more aspects of the disclosed embodiment the communication state is closed upon confirmation of shutdown of the selected at least one vehicle by the vehicle accountant controller.

In accordance with one or more aspects of the disclosed embodiment a communication state between the vehicle accountant controller and each of the multiple vehicles is normally closed and communication is opened by the vehicle accountant controller to the selected at least one vehicle in connection and substantially coincident with the vehicle accountant controller commanding activation of the selected at least one vehicle previously shutdown.

In accordance with one or more aspects of the disclosed embodiment an automated storage and retrieval system comprising:

a multilevel structure defining a storage array with multiple storage locations and defining a transport space distributed through the array for transporting store units; multiple independent automated vehicles configured for free roving the transport space for transportation of store units to and from storage locations in the storage array; personnel access zones formed in the transport space, each zone having transport space closure for closing the portion of the transport space coincident with each zone to entry of vehicles from outside the zone; and a control system configured to communicate with the vehicles over a remote communication system and, upon identification of a predetermined zone to be opened for personnel access, command evacuation of vehicles from within the predetermined zone and shutdown of each un-evacuated vehicle in the zone over the remote communication system with common communication links for evacuation and shutdown commands.

In accordance with one or more aspects of the disclosed embodiment wherein the control system, remote communication system and each vehicle of the multiple vehicles is configured so that shutdown, of each un-evacuated vehicle, in response to the shutdown command is secured and verified to satisfy IEC61508, SIL 3 category criteria.

In accordance with one or more aspects of the disclosed embodiment wherein the control system and remote communication system are configured so that shutdown commands are communicated via a black channel of the remote communication system to each un-evacuated vehicle.

In accordance with one or more aspects of the disclosed embodiment wherein the control system is configured so that presence of each un-evacuated vehicle in the predetermined zone is accounted for independent of vehicle position identification by the control system for task allocation.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A transportation system comprising:
a transportation space including destinations distributed in the transportation space;
multiple independent automated vehicles configured for free roving through the transportation space to and between the destinations so that the vehicles are dynamically distributed through the transportation space; and
a control system communicably connected via a remote communication link to each of the vehicles, the control system includes a vehicle accountant controller separate and distinct from a system controller, of the control system, directing each vehicle to different destinations, the vehicle accountant controller being connected via the remote communication link to each of the multiple independent automated vehicles and the vehicle accountant controller is configured to independently and automatically register a dynamic location of each of the multiple independent automated vehicles, selected from the multiple independent automated vehicles in the transportation space, commands stopping, via the remote communication link, of only the at least one selected independent automated vehicles at the registered location if the registered location corresponds to a user identified portion of the transportation space, and wherein the system controller effects routing changes of other of the at least one selected independent automated vehicles from the portion of the transportation space depending on the commanded stopping of the at least one selected independent automated vehicles.

2. The transportation system of claim 1, wherein each of the multiple independent automated vehicles is configured so that each of the multiple independent automated vehicles effects independent navigation through the transportation space.

3. The transportation system of claim 1, wherein the user identified portion of the transportation space defines a zone in the transportation space segregated from another zone in the transportation space.

4. The transportation system of claim 1, wherein the transportation space is three dimensional space with stacked levels, each level having at least one open deck and aisles for the multiple independent automated vehicles to traverse, the aisles communicating with the deck so that the multiple independent automated vehicles enter the aisles from the deck.

5. The transportation system of claim 1, wherein the remote communication link is common to both the system controller and the vehicle accountant controller.

6. The transportation system of claim 1, wherein the remote communication link is a wireless link.

7. The transportation system of claim 1, wherein the vehicle accountant controller is configured to use a black channel communication protocol over the remote communication link to command stopping of the at least one selected independent automated vehicles.

8. The transportation system of claim 1, wherein the vehicle accountant controller opens communication between the accountant controller and the at least one selected independent automated vehicles over the remote communication link for transmission of the stopping command to the at least one selected independent automated vehicles.

9. The transportation system of claim 1, wherein the communication protocol of the commanded stopping effects a secure and verified command on receipt by the selected at least one vehicle.

10. The transportation system of claim 1, wherein a communication state between the vehicle accountant controller and each of the multiple independent automated vehicles is normally closed and communication is opened by the vehicle accountant controller to the at least one selected independent automated vehicles in connection and substantially coincident with the vehicle accountant controller commanding stopping to the at least one selected independent automated vehicles.

11. The transportation system of claim 1, wherein a communication state between the vehicle accountant controller and each of the multiple independent automated vehicles is normally closed and communication is opened by the vehicle accountant controller to the at least one selected independent automated vehicles in connection and substantially coincident with the vehicle accountant controller commanding activation of the at least one selected independent automated vehicles previously stopped.

12. A transportation system comprises:

a transportation space including destinations distributed in the transportation space;

multiple independent automated vehicles configured for free roving through the transportation space to and between the destinations so that the vehicles are dynamically distributed through the transportation space; and a control system communicably connected via a remote communication link to each of the multiple independent automated vehicles, the control system includes a vehicle accountant controller separate and distinct from a system controller, of the control system, directing each vehicle to different destinations, the vehicle accountant controller being connected via the remote communication link to each of the multiple independent automated vehicles and the vehicle accountant controller is configured so that in response to being provided a user located portion of the transportation space in the transport space the vehicle accountant controller independently and automatically registers a dynamic location of each of at least one of the multiple independent automated vehicles corresponding to the user located portion of the transportation space, selectably commands stopping, via the remote communication link, of only the at least one independent automated vehicles at the registered location, and not other of the vehicles, and effects routing changes of other of the at least one selected independent automated vehicles from the portion of the transportation space depending on the commanded stopping of only the at least one independent automated vehicles at the registered location.

13. The transportation system of claim 12, wherein each of the multiple independent automated vehicles is configured so that the multiple independent automated vehicle effects independent navigation through the transportation space.

14. The transportation system of claim 12, wherein the user located portion of the transportation space defines a zone in the transportation space segregated from another zone in the transportation space.

15. The transportation system of claim 12, wherein the transportation space is three dimensional space with stacked levels, each level having at least one open deck and aisles for the vehicles to traverse, the aisles communicating with the deck so that the multiple independent automated vehicles enter the aisles from the deck.

16. The transportation system of claim 12, wherein the remote communication link is common to both the system controller and the vehicle accountant controller.

17. The transportation system of claim 12, wherein the remote communication link is a wireless link.

18. The transportation system of claim 12, wherein the vehicle accountant controller opens communication between the accountant controller and the at least one selected independent automated vehicles over the remote communication link for transmission of the commanded stopping to the at least one selected independent automated vehicles.

19. The transportation system of claim 12, wherein the communication protocol of the commanded stopping effects a secure and verified command on receipt by the at least one selected independent automated vehicles.

20. A method comprising:
providing a transportation space including destinations distributed in the transportation space;
providing multiple independent automated vehicles configured for free roving through the transportation space to and between the destinations so that the vehicles are dynamically distributed through the transportation space;
providing a control system communicably connected via a remote communication link to each of the vehicles and a vehicle accountant controller separate and distinct from a system controller, of the control system, directing each vehicle to different destinations, the vehicle accountant controller being connected via the remote communication link to each of the multiple independent automated vehicles;
independently and automatically registering, with the vehicle accountant controller of the control system, a dynamic location of each of the at least one of the multiple independent automated vehicles, selected from the multiple independent automated vehicles in the transportation space;
commanding stopping, via the remote communication link between the vehicle accountant controller and each of the multiple independent automated vehicles, of only the at least one selected independent automated vehicles at the registered location if the registered location corresponds to a user identified portion of the transportation space; and
the system controller effecting routing changes of other of the at least one selected independent automated vehicles from the portion of the transportation space depending on the commanded stopping of the selected at least one of the multiple independent automated vehicles.

21. The method of claim 20, further comprising effecting independent navigation through the transportation space of each of the multiple independent automated vehicles.

22. The method of claim 20, wherein the user identified portion of the transportation space defines a zone in the transportation space segregated from another zone in the transportation space.

23. The method of claim 20, wherein the transportation space is three dimensional space with stacked levels, each level having at least one open deck and aisles for the multiple independent automated vehicles to traverse, the aisles communicating with the deck so that the multiple independent automated vehicles enter the aisles from the deck.

* * * * *